(12) United States Patent
Lampotang et al.

(10) Patent No.: US 12,387,621 B2
(45) Date of Patent: Aug. 12, 2025

(54) SIMULATION FEATURES COMBINING MIXED REALITY AND MODULAR TRACKING

(71) Applicant: University of Florida Research Foundation, Incorporated, Gainesville, FL (US)

(72) Inventors: Samsun Lampotang, Gainesville, FL (US); David Erik Lizdas, Gainesville, FL (US); Barys Valerievich Ihnatsenka, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 546 days.

(21) Appl. No.: 17/376,498

(22) Filed: Jul. 15, 2021

(65) Prior Publication Data

US 2021/0343186 A1 Nov. 4, 2021

Related U.S. Application Data

(63) Continuation of application No. 15/538,990, filed as application No. PCT/US2016/012861 on Jan. 11, 2016, now Pat. No. 11,094,223.

(Continued)

(51) Int. Cl.
*G09B 23/28* (2006.01)
*G06T 19/00* (2011.01)
(Continued)

(52) U.S. Cl.
CPC .......... *G09B 23/285* (2013.01); *G06T 19/006* (2013.01); *G09B 9/00* (2013.01); *G09B 19/00* (2013.01)

(58) Field of Classification Search
CPC ........ G09B 23/28; G09B 23/285; G09B 9/00
See application file for complete search history.

(56) References Cited

U.S. PATENT DOCUMENTS 4,613,328 A 9/1986 Boyd
5,704,791 A 1/1998 Gillio
(Continued)

FOREIGN PATENT DOCUMENTS

EP 0696437 2/1996
EP 1533683 5/2005
(Continued)

OTHER PUBLICATIONS

International Searching Authority, International Search Report and Written Opinion for International Application No. PCT/US2016/012861, May 2, 2016, 16 pages, Korean Intellectual Property Office, Republic of Korea.

(Continued)

*Primary Examiner* — Timothy A Musselman
(74) *Attorney, Agent, or Firm* — ALSTON & BIRD LLP

(57) ABSTRACT

Techniques and systems are described for providing modularity, tracking and simulation features of a mixed reality simulator. A modular approach to tracking systems, tracked instruments, and interchangeable modular physical models is described. Enhanced indicators and indicator interfaces improve imaging probe and instrument orientation and alignment with respect to a physical target, including but not necessarily within a combined physical and virtual system; these include anisotropy indicators, indicators of alignment in both in-plane and out-of-plane ultrasound or other imaging techniques, and perpendicularity indicators for better placement of probes and instruments over curved surfaces. A universal needle hub is described that integrates tracking (Continued)

system components and simulation feedback components usably with varying needle types.

20 Claims, 22 Drawing Sheets

Related U.S. Application Data

(60) Provisional application No. 62/101,997, filed on Jan. 10, 2015.

(51) Int. Cl.
 *G09B 9/00* (2006.01)
 *G09B 19/00* (2006.01)

(56) References Cited

U.S. PATENT DOCUMENTS

| | | |
|---|---|---|
| 6,020,891 A | 2/2000 | Rekimoto |
| 6,024,576 A | 2/2000 | Bevirt et al. |
| 6,561,980 B1 | 5/2003 | Geng et al. |
| 6,714,901 B1 | 3/2004 | Cotin et al. |
| 6,842,175 B1 | 1/2005 | Schmalstieg et al. |
| 6,857,878 B1 | 2/2005 | Chosack et al. |
| 6,863,536 B1 | 3/2005 | Fisher et al. |
| 7,130,447 B2 | 10/2006 | Aughey et al. |
| 7,747,311 B2 | 6/2010 | Quaid, III |
| 8,066,629 B2 | 11/2011 | Dlugos |
| 8,425,418 B2 | 4/2013 | Suri et al. |
| 8,948,845 B2 | 2/2015 | Glossop |
| 9,521,994 B2 | 12/2016 | Kamen et al. |
| 9,626,805 B2 | 4/2017 | Lampotang et al. |
| 9,681,818 B2 | 6/2017 | Glossop |
| 10,026,191 B2 | 7/2018 | Accomando et al. |
| 10,881,375 B2 | 1/2021 | Takimoto et al. |
| 2002/0168618 A1 | 11/2002 | Anderson et al. |
| 2003/0135115 A1 | 7/2003 | Burdette |
| 2003/0220557 A1 | 11/2003 | Cleary et al. |
| 2004/0064298 A1 | 4/2004 | Levine |
| 2004/0097805 A1 | 5/2004 | Verard et al. |
| 2004/0175684 A1 | 9/2004 | Kaasa et al. |
| 2005/0084833 A1 | 4/2005 | Lacey et al. |
| 2006/0008786 A1 | 1/2006 | Feygin et al. |
| 2006/0099557 A1 | 5/2006 | Hyltander et al. |
| 2006/0152516 A1 | 7/2006 | Plummer |
| 2007/0016050 A1 | 1/2007 | Moehring et al. |
| 2007/0060391 A1 | 3/2007 | Ikeda et al. |
| 2007/0236514 A1 | 10/2007 | Agusanto et al. |
| 2008/0070684 A1 | 3/2008 | Haigh-Hutchinson |
| 2008/0171311 A1 | 7/2008 | Centen et al. |
| 2008/0172119 A1 | 7/2008 | Yamasaki et al. |
| 2008/0187896 A1 | 8/2008 | Savitsky |
| 2008/0200926 A1 | 8/2008 | Verard et al. |
| 2008/0287794 A1 | 11/2008 | Li et al. |
| 2009/0093715 A1 | 4/2009 | Downey et al. |
| 2009/0326556 A1 | 12/2009 | Diolaiti et al. |
| 2010/0036199 A1 | 2/2010 | Karasawa et al. |
| 2010/0159434 A1 | 6/2010 | Lampotang et al. |
| 2010/0167249 A1 | 7/2010 | Ryan |
| 2010/0167250 A1 | 7/2010 | Ryan et al. |
| 2010/0172559 A1 | 7/2010 | Kumar et al. |
| 2010/0196865 A1* | 8/2010 | Kays .................. G09B 23/32 434/268 |
| 2010/0225340 A1 | 9/2010 | Smith et al. |
| 2010/0298705 A1 | 11/2010 | Pelissier et al. |
| 2011/0046483 A1 | 2/2011 | Fuchs et al. |
| 2011/0091855 A1 | 4/2011 | Miyazaki |
| 2011/0170752 A1 | 7/2011 | Martin et al. |
| 2011/0227913 A1 | 9/2011 | Hyndman |
| 2012/0038639 A1 | 2/2012 | Mora et al. |
| 2012/0259209 A1 | 10/2012 | Harhen |
| 2013/0323700 A1 | 12/2013 | Samosky et al. |
| 2013/0330701 A1 | 12/2013 | Rubinstein et al. |
| 2014/0071165 A1 | 3/2014 | Tuchschmid et al. |
| 2015/0125840 A1 | 5/2015 | Pastrick et al. |
| 2016/0133056 A1 | 5/2016 | Lampogang et al. |
| 2017/0221387 A1 | 8/2017 | Lampotang et al. |
| 2017/0372640 A1 | 12/2017 | Lampotang et al. |
| 2021/0134068 A1 | 5/2021 | Lampotang et al. |

FOREIGN PATENT DOCUMENTS

| | | |
|---|---|---|
| EP | 1858418 B1 | 8/2017 |
| JP | 2002-500941 A | 1/2002 |
| JP | 2003-210386 A | 7/2003 |
| JP | 2005-525598 A | 8/2005 |
| JP | 2006201092 A | 8/2006 |
| JP | 5416900 B2 | 2/2014 |
| JP | 2017080501 A | 5/2017 |
| KR | 10-2003-0044909 A | 6/2003 |
| KR | 10-2003-0083695 A | 10/2003 |
| KR | 1007-48269 B1 | 8/2007 |
| WO | WO-1997/023172 A2 | 7/1997 |
| WO | WO-1999/038141 A1 | 1/1999 |
| WO | WO-1999/042978 A1 | 8/1999 |
| WO | WO-2002/059859 A1 | 8/2002 |
| WO | WO-2003/096307 A1 | 11/2003 |
| WO | WO-2009/049282 A2 | 4/2009 |
| WO | WO-2009/094646 A2 | 7/2009 |
| WO | WO-2011/127379 A1 | 10/2011 |
| WO | WO-2013/155156 A1 | 10/2013 |
| WO | WO 2015131162 A2 | 9/2015 |
| WO | WO-2016/007717 A1 | 1/2016 |

OTHER PUBLICATIONS

Gallo, Luigi et al. *3D Interaction With Volumetric Medical Data Experiencing The Wiimote*. Proceedings of the 1st International Conference on Ambient Media and Systems, ICST (Institute for Computer Sciences, Social-Informatics and Telecommunications Engineering), 2008, (6 pages).

Quarles, John et al. *A Mixed Reality Approach For Merging Abstract and Concrete Knowledge*, Proceedings of IEEE Virtual Reality, Feb. 2008, pp. 27-34, Reno, Nevada, USA.

Zhu, Yanong et al. *A Virtual Ultrasound Imaging System for the Simulation of Ultrasound-Guided Needle Insertion Procedures*, In Proceedings of Medical Image Understanding and Analysis (MIUA), Jul. 2006, pp. 61-65.

Goksel, Orcun et al. *B-Mode Ultrasound Image Simulation in Deformable 3D Medium*, IEEE Transactions on Medical Imaging, Mar. 2009, vol. 28, No. 11, pp. 1657-1669.

Quarles, John et al. *Collocated AAR: Augmenting After Action Review With Mixed Reality*, 7th Ieeea/ACM ISMAR, Sep. 2008, pp. 1-10, Cambridge, United Kingdom.

Fuhrmann, Anton et al. *Concept and Implementation of a Collaborative Workspace for Augmented Reality*, Graphics'99, vol. 18, No. 3, (1999), pp. 1-11.

Bichlmeier, Christoph et al. *Contextual Anatomic Mimeses: Hybrid In-Situ Visualization Method for Improving Multi-Sensory Depth Perception in Medical Augmented Reality*, ISMAR, 6th IEEE and ACM International Symposium on Mixed and Augmented Reality, (2007), (10 pages).

Hu, John et al. *Effectiveness of Haptic Feedback in Open Surgery Simulation and Training Systems*, Studies in Health Technology and Informatics, vol. 119 (2006), pp. 213-218.

Bichlmeier, Christoph et al. *Improving Depth Perception in Medical AR: A Virtual Vision Panel to the Inside of the Patient*, Bildverabeitung für die Medizin, Springer Berlin Heidelberg, (2007), pp. 217-221.

Quarles, John et al. *Tangible User Interfaces Compensate for Low Spatial Cognition*, Proceedings of IEEE Symposium on 3D User Interfaces, Mar. 2008, pp. 11-18, Reno, Nevada, USA.

Stoev, Stanislav L. *Two-Handed Through-The-Lens-Techniques for Navigation in Virtual Environments*, . Immersive Projection Technology and Virtual Environments, (2001), pp. 51-60, Springer Vienna.

Hinckley, Ken et al. *Two-Handed Virtual Manipulation*, ACM Transactions on Computer-Human Interaction, vol. 5, No. 3, Sep. 1998, pp. 260-302.

(56) References Cited

OTHER PUBLICATIONS

Knudsen, Bodo E. et al. *A Randomized, Controlled, Prospective Study Validating the Acquisition of Percutaneous Renal Collecting System Access Skills Using a Computer Based Hybrid Virtual Reality Surgical Simulator: Phase I*, The Journal of Urology, Nov. 2006, vol. 176, No. 5, pp. 2173-2178. DOI: 10.1016/j.juro.2006.07.011.
*PERC Mentor: Computerized Training Simulator for Percutaneous Access Puncturing*, Users Manual for the Combined PERC Mentor™ & URO Mentor™ Simulator, Version 2.03, Feb. 2003, Simbionix Computer Assisted Endoscopy, (33 pages).
Wignall, Geoffrey R. et al. *Surgical Simulation: A Urological Perspective*, The Journal of Urology, May 2008, vol. 179, No. 5, pp. 1690-1699. DOI: 10.1016/j.juro.2008.01.014.
International Searching Authority, International Search Report and Written Opinion for International Application No. PCT/US2011/031738, Feb. 8, 2012, (6 pages), Korean Intellectual Property Office, Republic of Korea.
NonFinal Office Action for U.S. Appl. No. 13/514,474, May 2, 2014, (23 pages), U.S. Patent and Trademark Office, USA.
Final Office Action for U.S. Appl. No. 13/514,474, Dec. 3, 2014, (33 pages), U.S. Patent and Trademark Office, USA.
NonFinal Office Action for U.S. Appl. No. 13/514,474, May 12, 2015, (25 pages), U.S. Patent and Trademark Office, USA.
Notice of Allowance for U.S. Appl. No. 13/514,474, Sep. 25, 2015, (9 pages), U.S. Patent and Trademark Office, USA.
NonFinal Office Action for U.S. Appl. No. 14/980,891, Apr. 27, 2016, (27 pages), U.S. Patent and Trademark Office, USA.
Final Office Action for U.S. Appl. No. 14/980,891, Aug. 23, 2016, (13 pages), U.S. Patent and Trademark Office, USA.
Notice of Allowance for U.S. Appl. No. 14/980,891, Dec. 13, 2016, (5 pages), U.S. Patent and Trademark Office, USA.
Final Office Action for U.S. Appl. No. 15/485,404, Jun. 13, 2019, (28 pages), U.S. Patent and Trademark Office, USA.
NonFinal Office Action for U.S. Appl. No. 15/485,404, May 26, 2017, (25 pages), U.S. Patent and Trademark Office, USA.
Final Office Action for U.S. Appl. No. 15/485,404, Sep. 20, 2017, (24 pages), U.S. Patent and Trademark Office, USA.
NonFinal Office Action for U.S. Appl. No. 15/485,404, Jan. 24, 2018, (17 pages), U.S. Patent and Trademark Office, USA.
Final Office Action for U.S. Appl. No. 15/485,404, Jul. 27, 2018, (22 pages), U.S. Patent and Trademark Office, USA.
NonFinal Office Action for U.S. Appl. No. 15/485,404, Jan. 18, 2019, (21 pages), U.S. Patent and Trademark Office, USA.
NonFinal Office Action for U.S. Appl. No. 15/485,404, Feb. 5, 2020, (20 pages), U.S. Patent and Trademark Office, USA.
NonFinal Office Action for U.S. Appl. No. 15/485,404, Sep. 25, 2019, (20 pages), U.S. Patent and Trademark Office, USA.
NonFinal Office Action for U.S. Appl. No. 15/538,990, Jan. 9, 2020, (7 pages), U.S. Patent and Trademark Office, USA.
Final Office Action for U.S. Appl. No. 15/485,404, Jun. 16, 2020, (30 pages), U.S. Patent and Trademark Office, USA.
NonFinal Office Action for U.S. Appl. No. 15/538,990, Sep. 16, 2020, (15 pages), U.S. Patent and Trademark Office, USA.
Notice of Allowance for U.S. Appl. No. 15/485,404, Sep. 17, 2020, (7 pages), U.S. Patent and Trademark Office, USA.
U.S. Appl. No. 15/538,990, filed Jun. 22, 2017, U.S. Pat. No. 11,094,223, Issued.
PCT/US2016/012861, Jan. 11, 2016, WO 2016/112383, Expired.
U.S. Appl. No. 62/101,997, filed Jan. 10, 2015, Expired.
Chen, Valerie H. et al. "Utility of a 3-Dimensional Transrectal Ultrasound-Guided Prostate Biopsy System for Prostate Cancer Detection," *Technology in Cancer Research & Treatment*, vol. 8, No. 2, Apr. 2009, pp. 99-103, DOI:10.1177/153303460900800202.
Extended European Search Report for European Patent Application No. 20769292.2, dated Oct. 26, 2022, (13 pages), European Patent Office, Munich, Germany.
Han, Misop et al. "Geometric Evaluation of Systematic Transrectal Ultrasound Guided Prostate Biopsy," The Journal of Urology, vol. 188, No. 6, Dec. 2012, pp. 2404-2409, DOI: 10.1016/j.juro.2012.07.107, (NIH Public Access, Author Manuscript, Dec. 31, 2013).
Hanna, Nawar et al. "Multiparametric Magnetic Resonance Imaging-Ultrasound Fusion Biopsy Improves but Does Not Replace Standard Template Biopsy for the Detection of Prostate Cancer," *The Journal of Urology*, vol. 202, No. 5, Nov. 2019, pp. 944-951.
International Search Report and Written Opinion for International Application No. PCT/US2020/022713, dated Jun. 3, 2020, (10 pages), United States Patent and Trademark Office, US.
Lampotang, Samsun et al. "Baseline Prevalence and Magnitude of Spatial Deviations in a Simulator from the Transrectal Ultrasound Prostate Biopsy Template," *The Journal of Urology*, vol. 201, Issue Supplement 4, May 4, 2019, pp. e503-e504.
Markert, Mathias. "Development of a Clinically Suitable Assistance System for Liver Surgery," Doctoral Dissertation, Technical University of Munich, Jan. 31, 2011, (149 pages).
Megwalu, Ifeanyichukwu I. et al. "Evaluation of a Novel Precision Template-Guided Biopsy System for Detecting Prostate Cancer," *BJUI International*, vol. 102, pp. 546-550, Year: 2008, DOI: 10.1111/j.1464-410X.2008.07832.x.
Rosenkrantz, Andrew B. et al. "Evolving Use of Prebiopsy Prostate Magnetic Resonance Imaging in the Medicare Population," *The Journal of Urology*, vol. 200, No. 1, Jul. 1, 2018, pp. 89-94.
Non-Final Office Action for Japanese Application No. 2021-554731, dated Nov. 2, 2023, 12 pages.

* cited by examiner

SIMULATION FEATURES COMBINING MIXED REALITY AND MODULAR TRACKING

CROSS-REFERENCE TO A RELATED APPLICATION

This application is a continuation of, and claims the benefit of priority of, U.S. patent application Ser. No. 15/538,990, filed Jun. 22, 2017 and titled, "SIMULATION FEATURES COMBINING MIXED REALITY AND MODULAR TRACKING," which claims the benefit of National Stage Application of International Application No. PCT/US2016/012861, filed Jan. 11, 2016; which claims the benefit of U.S. provisional application Ser. No. 62/101,997, filed Jan. 10, 2015, both of which are incorporated herein by reference in their entirety.

STATEMENT REGARDING FEDERALLY SPONSORED RESEARCH OR DEVELOPMENT

This invention was made with government support under grant number W81XWH-14-1-0113, awarded by U.S. Army Medical Research Acquisition Activity. The government has certain rights in the invention.

BACKGROUND

In general, a simulation provides representations of certain key characteristics or behaviors of a selected physical or abstract system. Simulations can be used to show the effects of particular courses of action. A physical simulation is a simulation in which physical objects are substituted for a real thing or entity. Physical simulations are often used in interactive simulations involving a human operator for educational and/or training purposes. For example, mannequin patient simulators are used in the healthcare field, flight simulators and driving simulators are used in various industries, and tank simulators may be used in military training Physical simulations or objects provide a real tactile and haptic feedback for a human operator and a 3-dimensional (3D) interaction perspective suited for learning psychomotor and spatial skills.

In the health care industry, as an example, medical simulators are being developed to teach therapeutic and diagnostic procedures, medical concepts, and decision making skills. Many medical simulators involve a computer or processor connected to a physical representation of a patient, also referred to as a mannequin patient simulator (MPS). These MPSs have been widely adopted and consist of an instrumented mannequin that can sense certain interventions and, via mathematical models of physiology and/or pharmacology, the mannequin reacts appropriately in real time. For example, upon sensing an intervention such as administration of a drug, the mannequin can react by producing an increased palpable pulse at the radial and carotid arteries and displaying an increased heart rate on a physiological monitor. In certain cases, real medical instruments and devices can be used with the life-size MPSs and proper technique and mechanics can be learned.

Physical simulations or objects are limited by the viewpoint of the user. In particular, physical objects such as anesthesia machines (in a medical simulation) and car engines (in a vehicle simulation) and physical simulators such as MPSs (in a medical simulation) remain a black-box to learners in the sense that the internal structure, functions and processes that connect the input (cause) to the output (effect) are not made explicit. Unlike a user's point of reference in an aircraft simulator where the user is inside looking out, the user's point of reference in, for example, a mannequin patient simulator is from the outside looking in any direction at any object, but not from within the object. Furthermore, it can be difficult to create a physical simulator having internal features that can be repeatedly interacted with, or having anatomical variations such as differences in size, orientation, position, shape, etc., of vessels, organs and structures.

Virtual simulations have also been used for education and training. Typically, the simulation model is instantiated via a display such as a computer, PDA or cell phone screen; or a stereoscopic, 3D, holographic or panoramic display. An intermediary device, often a mouse, joystick, or Wii™, is needed to interact with the simulation. When an intermediary device such as a mouse, joystick or haptic device is used, the interaction of the user with the simulator is described as being mediated; unfortunately, the deficiencies or limitations of the mediating device are often inherited by the simulator, thereby reducing its capabilities or realism.

In contrast, when a user can use a tool as it would be used in the actual (non-simulated) environment, the interaction is direct and non-mediated, and the interaction can be more realistic and suffer from fewer limitations compared to a mediated interaction. When a needle or other instrument such as an endoscopic tool is inserted into a simulator, there are two main approaches to simulate the insertion. A fixed point of entry simulator has predetermined entry point(s) for insertion of the instrument into the body. With a fixed point of entry simulator, sensors and trackers can be prepositioned at the fixed points of entry, as the latter are known a priori. In some actual medical procedures (e.g., ventriculostomy, central venous access, and regional anesthesia) an important determinant of the eventual success of the procedure is the proper selection of the point of entry, sometimes based on anatomical landmarks and heuristic rules or prior identification of landmarks via medical imaging such as ultrasound (US) and subsequent marking of the skin. In simulators for procedures where selection of the proper entry point is one of the main learning objectives, a fixed point of entry simulator does not adequately fulfill the training objectives. An advantageous system allows the learner to select any point of entry (correct and incorrect) and learn from any subsequent mistakes without putting actual patients at risk. Imaging technologies such as ultrasound (US) can be used to guide or assist. In an US-guided procedure, the US probe is held in one hand while advancing the instrument such as a needle with the other hand, ideally while visualizing the anatomy and the instrument via US; this requires right hand/left hand coordination and skills. In an US-assisted procedure, US imaging is used to locate anatomical landmarks and marks are made on the skin of the patient to help in determining the entry point. When the needle in actually inserted, US imaging is not used, unlike US-guided needling.

Virtual abstract simulations, such as transparent reality simulations of anesthesia machines and medical equipment or drug dissemination during spinal anesthesia, emphasize the internal structure, functions and processes of a simulated system. For example, gases, fluids and substances that are usually invisible or hidden can be made visible or even color-coded and their flow and propagation can be visualized within the system. However, in a virtual simulation, the simulator cannot be directly touched like a physical simulation. In the virtual simulations, direct interaction using one's hands or real instruments such as laryngoscopes or a wrench is also difficult to simulate. For example, it can be difficult to simulate a direct interaction such as turning an oxygen flowmeter knob or opening a spare oxygen cylinder in the back of the anesthesia machine.

In addition, important tactile and haptic cues, such as the deliberately fluted texture of an oxygen flowmeter knob in an anesthesia machine or the pressure in a needle/syringe felt when moving through fat and muscle or impinging on bone structures, are missing. Furthermore, the emphasis on internal processes and structure may cause the layout of the resulting virtual simulation to be abstracted and simplified and thus different from the actual physical layout of the real system. This type of abstract representation, while suited for assisting learning by simplification and visualization, may present challenges when transferring what was learned to the actual physical system.

Accordingly, simulation systems capable of in-context integration of virtual representations with a physical simulation or object have been developed. In some cases, simulation systems having both physical and virtual qualities have been integrated to assist in the performance of actual procedures or functions. These types of combined systems provide an opportunity for the integration of assistive virtual viewpoints and cognitive aids. In addition, 3D, color-coded, real-time visualization can represent both the virtual and physical components of the simulator. Some components of the simulator exist as both physical and virtual entities, others exist only as virtual entities and some as only physical objects.

BRIEF SUMMARY

Techniques and systems are described for providing features of a mixed reality simulator. In some embodiments, techniques and systems are described for enhanced indicators that improve imaging probe/implement (such as ultrasound) and instrument (such as needle) orientation and alignment within a combined physical and virtual (mixed reality) system. In a mixed reality system having a physical model, virtual model, and tracked instruments, indicator interfaces may be displayed containing cognitive aids for enhancing the accuracy of an imaging/ultrasound probe or other imaging implement and instrument placement with respect to a physical target. The cognitive aids include anisotropy indicators, indicators of alignment in both in-plane and out-of-plane imaging-guided techniques, and perpendicularity indicators for better placement such as placing the imaging probe perpendicular to a curved surface by aligning the probe to the normal of the curved surface.

In some embodiments, a tracked TUI may be used to control other imaging implements, such as fluoroscopy X-ray sources.

Certain features of the techniques and systems may be implemented in the context of a combined physical and virtual system that can be employed both in simulation training scenarios and in actual procedural cases. An exemplary use for the techniques and systems is in simulated and actual medical procedures using an ultrasound; however, techniques and systems are generally applicable to other fields that may employ the use of ultrasound imaging and/or ultrasound-guided or ultrasound-assisted procedures in a mixed reality system, such as the defusing of bombs.

Some embodiments include a mixed reality simulator comprising a virtual model; at least one tracked tool; a tracking system for tracking the position and orientation of the at least one tracked tool; two or more modular physical models, at least one modular physical model having a fixed point of entry by the at least one tracked tool, and at least one modular physical model having a non-fixed point of entry by the at least one tracked tool; and at least one modular stand for mounting the two or more modular physical models, wherein the two or more modular physical models are connected to the virtual model such that a virtual representation in the virtual model is maintained as a user moves from one modular physical model to another modular physical model.

In some implementations, a combined physical and virtual system can include objects or learning aids in the physical and/or virtual model that can be used for simulation. Interchangeable physical objects (e.g., simulated anatomical structures) can use a magnetic tracking system (such as an NDI/Ascension Medium Range Transmitter MRT or Short Range Transmitter SRT) to assist the combined physical and virtual system in determining the location and orientation of instruments.

Since the tracking system can be one of the most costly items present in a combined physical and virtual system, embodiments may advantageously use a modular approach to the mounting of different physical objects, such as simulated anatomical structures, on a single mounting containing the MRT. Some examples of medical procedures that may benefit from a modular design include ventriculostomy (also known as external ventricular drain or EVD), central venous access (CVA), transrectal ultrasound (TRUS) guided manual biopsy of the prostate, thyroid biopsy, hip effusion biopsy, other types of blind, guided or assisted biopsies, cross-sectional literacy and ultrasonography skills trainers, intravenous line access, chest tube placement, pediatric caudal block and regional anesthesia (RA) as well as veterinary procedures for all animals (mammals, fish, reptiles, amphibians, etc.).

In some embodiments, a universal needle hub provides modular mounting for different types of needles used in medical procedures. In some cases, the needle hub can provide auditory, visual, or tactile feedback as part of a mixed reality simulation.

Unlike other simulators, the simulators of this invention are suited for non-mediated user interaction where users handle the tools they would use in real life directly with their hands, as well as for procedures where a non-fixed, flexible, user-determined point of entry is a learning objective for trainees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1B and 1C show examples of an ultrasonography skills application with a 3D visualization of the virtual environment.

DETAILED DESCRIPTION

Figure 1A:
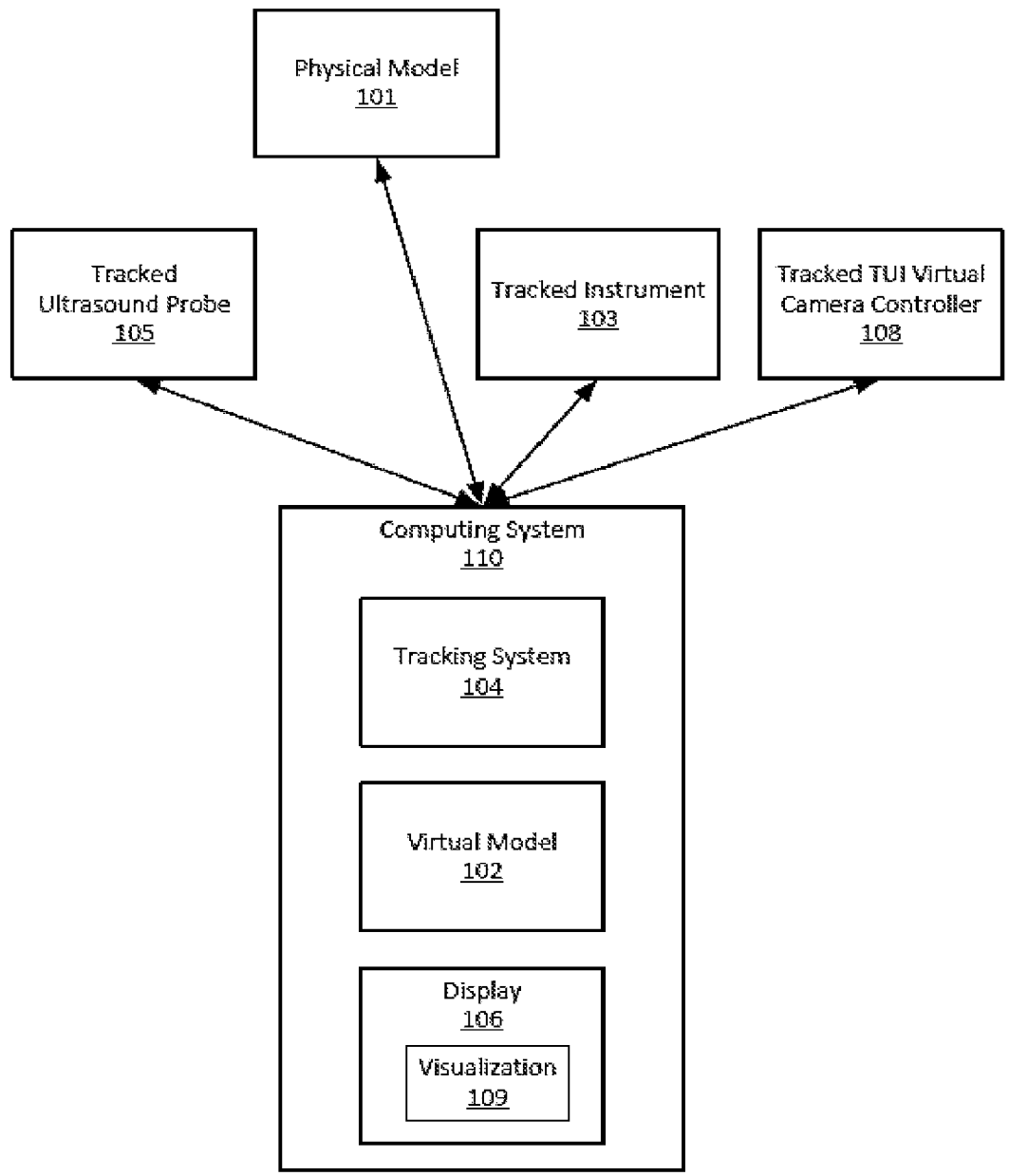
FIGS. 1A-1C show an example component environment and example views in a combined physical and virtual (mixed reality) system.

In some implementations of the subject invention, techniques and systems are described for enhanced capabilities in mixed reality simulators, such as indicators that improve imaging probe/implement (e.g., ultrasound) and instrument orientation and alignment within a combined physical and virtual reality system. In certain embodiments, given a mixed reality system having a physical model, tracked instruments, and a virtual model, indicator interfaces may be displayed containing cognitive aids for enhancing the accuracy of imaging probe and instrument placement and technique with respect to a physical or virtual target. The cognitive aids include anisotropy indicators, indicators of alignment of the tool (e.g., needle) in both in-plane and out-of-plane imaging-guided tool insertion (e.g., needling) techniques, and perpendicularity indicators for better placement of probes and instruments over curved surfaces for insertion techniques assisted by medical imaging such as ultrasonography.

Certain features of the techniques and systems may be implemented in the context of a combined physical and virtual system that can be employed both in simulation training scenarios and in actual procedural cases. An exemplary use for the techniques and systems is in simulated and actual medical procedures using ultrasound, X-ray, fluoroscopic, MRI or CT imaging; however, techniques and systems are generally applicable to other fields that may employ the use of various imaging techniques in a mixed reality system, such as the defusing of bombs.

In certain embodiments, an imaging probe is an ultrasound probe. Ultrasound waves emitted from an ultrasound probe create an image when the waves reflect from the structures being insonated (e.g., an organ or needle) back to the ultrasound probe. However, when the ultrasound waves are incident on the surface of the structure at too great an angle (e.g., greater than 45°) from the normal to that surface, then the waves may mostly reflect away from the ultrasound probe and become undetectable. Consequently, the structures being insonated may disappear from the ultrasound image, despite still being physically present, a phenomenon sometimes described as "now you see me, now you don't".

Disappearance of a structure due to position and/or orientation of the ultrasound probe is a type of "anisotropy," which is a well-known property in medical ultrasound imaging. Expressions of anisotropy range from a disappearing hard structure (such as a needle), to different resulting echogenicity of soft structures (such as tendons) when the angle (orientation) of the ultrasound probe (and hence also the insonation plane) is changed. For instance, tendon fibers appear hyperechoic (bright) when the probe is perpendicular to the tendon, but can appear hypoechoic (darker) when the probe is angled obliquely. Anisotropy can be a source of interpretation error for experienced and inexperienced practitioners alike, hence the need for cognitive aids that both train and assist ultrasonography practitioners in maintaining the proper ultrasound probe angle during a particular type of usage. Anisotropy also applies to surfaces of simulated soft tissues and interfaces between different tissue types or fascia in the new simulator technology being described. For example, the lung can be imaged and appears in the simulated US image if the angle between the insonation plane and the normal to the surface of the lung being imaged does not exceed a certain angle such as 45°. In addition, the image of the lung observed on the simulated US image can be seen to slide ("lung slide" or "pleural slide"). If the user accidentally causes an undesirable pneumothorax during a simulated procedure, the "lung slide" no longer appears on the simulated US image. Sometimes a pneumothorax (PTX) or other complication does not immediately cause detectable symptoms even though it has actually occurred. A user adjustable setting can provide options when a learner has caused a pneumothorax or other complication. Settings could include, for example, immediately announcing visually and/or via audio or via simulated US, turning the announcement off, or randomizing the announcement of PTX or other complication when it has occurred.

There are two major techniques when using US to guide an instrument, the in-plane approach and the out-of-plane approach. With the in-plane approach, the needle or other instrument enters the skin at the "short" side of the probe, i.e., the side of the insonating plane. The needle is ideally aligned with and traverses the plane of ultrasound ("insonating plane"); the whole shaft is visualized as a line as it progresses towards the target. With the out-of-plane approach, the needle enters the skin on the long side of the probe, and is ideally perpendicular to the insonating plane. With this approach just the needle tip (ideally) or a circular cross-section of the needle (that could be further away from the tip) is visualized and the remainder of the needle is not visible on the simulated ultrasound image. The in-plane approach generally produces a larger needle image (a line instead of a dot), which is easier to observe. Various implementations can simulate needle anisotropy for both in-plane and out of plane techniques and all other such variants. Anisotropy is also simulated for tissues and fascia.

In sum, the position and orientation of an ultrasound or other imaging probe relative to various instruments or surfaces being viewed is an important aspect of proper technique (imaging, interpretation, guidance). Certain embodiments described herein enable the presentation of indicators that assist a practitioner in orienting one or more of an imaging probe, tracked instrument, and a tracked object or surface with respect to one another; in some instances, the object representing the anatomy may not need to be tracked. Indicators are part of cognitive aids displayed on a monitor, in that they are representations of the position and orientation and in some cases alignment, perpendicularity or orthogonality of various system components (e.g., imaging probe, tracked instrument, tracked object or surface) with respect to one another, in certain cases with a fixed reference point. In some implementations, the indicators are presented in the form of the output of an orthographic virtual camera that maintains a particular perspective at all times, while showing the relationship of various instruments or tracked objects to an imaging probe or its imaging plane. In some implementations, indicators are processed by the computing system and rendered on a display, as described in FIG. 1A.

The viewpoint of the various indicators is calculated based on the position in space (x, y, and z) and the orientation in space (yaw, pitch, and roll) of a tracked instrument, object, or surface, and in some cases the ultrasound/imaging probe and its insonating/imaging plane. These positions and rotations may be tracked by a tracking system and sensors (such as 6 degrees of freedom, or "6 DOF" sensors) as described in FIG. 1A. While the preferred alignment may be perpendicular, in some instances, a non-perpendicular approach is acceptable if it can be performed consistently or repeatably.

As a result of knowing the position and orientation of one or more of the various components in the physical model, their orientation with respect to one another can be calculated by the computing system and presented in an orthographic view as described. Non-orthographic cameras/views are also contemplated for all instances where an orthographic camera (preferred) is mentioned. The view can be presented to the user as part of an indicator that is designed to point out a specific desired orientation between two components that may be helpful for a particular procedure.

One kind of indicator is an anisotropy indicator. In an example of an anisotropy indicator for ultrasound imaging, anisotropy refers to an objects' visibility in ultrasound being dependent on the angle of incidence between the insonating rays and the surface of the object. An anisotropy indicator shows a view of the orientation of a tracked instrument, such as a needle, in reference to the orientation of an ultrasound probe and its insonating plane. The anisotropy indicator shows a virtual viewpoint from a virtual orthographic camera that remains perpendicular to a plane defined by two lines: (a) the midline or other characteristic line of an instrument and (b) a ray (that is part of the insonating plane) that strikes the midline of the instrument. One interface element in the indicator depicts the insonating plane of the ultrasound probe and another interface element shows the relative angle of positioning of the tracked object or surface with respect to the incident beam of the ultrasound's insonating plane. In some implementations, an interface element showing the reflection beam(s) of the incident beam may also be presented. Examples of an anisotropy indicator will be presented in FIGS. 4A-4C.

Another kind of indicator is an in-plane indicator, which shows whether a tracked instrument is in the imaging plane of an imaging probe and at what orientation the instrument is with respect to the imaging plane. The in-plane indicator is a virtual viewpoint depicting the output of a virtual orthographic camera that looks down the ultrasound probe's insonating plane from the top. Interface elements show the insonating plane and the tracked instrument, and the relationship of the interface elements to one another shows the relative orientation between the insonating plane and the tracked instrument. Other implementations may place the virtual orthographic camera on the needle instead of the ultrasound probe. In this instance, the user may be tasked with bringing the ultrasound probe to the needle instead of the converse.

The level of contact between the interface elements (i.e., the number of contact points and the position of the contact points) indicate the relationship between the needle or other tracked instrument and the insonating or imaging plane. Perfect in-plane alignment is shown by totally overlapping elements. Flawed in-plane alignment that results in complete invisibility of the tracked instrument on a simulated display of a medical image is shown by non-intersecting lines. Incorrect alignment, as during an out-of-plane approach or a flawed in-plane orientation during in-plane technique, is shown by bisecting lines. Examples of in-plane and out-of-plane indicators are shown in FIGS. 3A-3E. It should be understood that such indicators can be used not only in simulation-based training but could also be repurposed for use in actual patient care.

Another kind of indicator is a perpendicularity indicator, which renders a virtual viewpoint depicting an output from a virtual orthographic camera that views, from above a particular point on a surface, a virtual model of the surface (e.g., the skin of a patient in the physical model). The viewpoint of the virtual camera remains perpendicular to the surface being viewed, imaged or insonated at all times, even on a curved surface such as a skull or the dorsal surface of the upper torso.

Figure 5B:
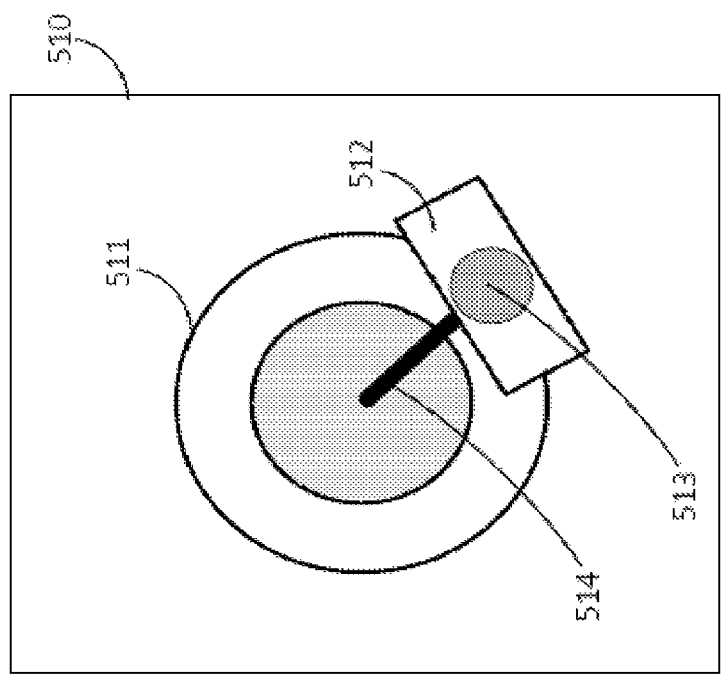
FIGS. 5A-5B show examples of an implementation of a perpendicularity indicator.
Figure 5A:
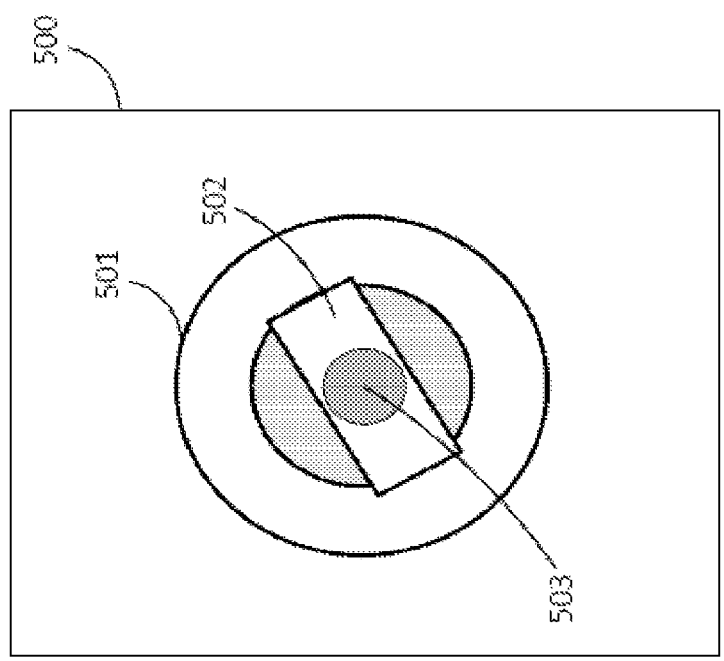

An interface element on the perpendicularity indicator centers the particular point of focus, and another interface element shows the relationship of the tracked instrument (e.g., ultrasound probe, TUI (Tangible User Interface) for a C-arm for fluoroscopy, or needle) to the perpendicular line from that particular point (the normal). When the tracked instrument is aligned with the perpendicular line, a targeting cue, such as a dot or circle, is centered over the first interface element. Non-centered placement of the targeting cue indicates various kinds of misplacements of the tracked instrument in the physical model. Examples of perpendicularity indicators are shown in FIGS. 5A-5B. Thresholds or ranges for alignment can also be used so that, for example, 90% alignment is acceptable instead of perfect alignment.

Indicators as described herein may be applicable to combined physical and virtual reality systems in simulated and real scenarios or procedures, e.g., during training for a medical procedure and during an actual medical procedure.

FIG. 1A shows an example component environment for enhanced orientation indicators in a combined physical and virtual reality system. Referring to FIG. 1A, a combined physical and virtual (mixed reality) system can include a physical model 101 of an object and a virtual model 102 of internal features of the object that are registered and underlay the physical model 101 as well as external features.

In some implementations, the external surface of an object or system (such as the relevant region of a human or animal body) is implemented as a physical form for purposes of a simulation, while part or all of the internal structure, processes, and functions inside the model may be implemented virtually. In certain embodiments, one or more of the internal features can be present in the physical model 101. The physical model 101 may also include, beyond the physical body part, the physical simulated imaging probe, the physical needle or tool, and the physical TUI camera controller 108. In other implementations, some internal features do not have a physical presence within the physical model 101. Instead, certain internal features such as blood vessels and lungs only have a presence in the virtual model 102.

The virtual model may also include the virtual representations of the physical needle, imaging probe, and other physical parts of the system. The virtual tool can be enhanced with a virtual light at the tip of a needle or tool to enhance visibility and depth perception in the 3D, color, real-time visualization. In the 3D visualization and the simulated medical image, the virtual blood vessels can be shown to collapse (where appropriate) when pressure is externally applied to them, e.g., via pushing down with an imaging probe or when a needle tip is approaching the vessel wall. The collapse depicted in the medical image is derived from generating a 2D cross-section in real time of the intersection between the imaging plane and the 3D visualization with the collapsed vessel. Further, the vein can be shown to collapse under pressure since it is at lower pressure compared to arteries while arteries do not collapse under similar pressure. The simulated US or other imaging probe can be fitted with pressure or force sensors (such as force sensitive resistors, or FSR) to allow measurement of the force with which the US or other imaging probe is being pushed down. The higher the measured force, the more the vessel collapses in both the visualization and the medical image. In some cases, more than one pressure or force sensor can be used so that non-uniform application of pressure across the simulated imaging probe face (which is sometimes done intentionally but often unintentionally) can be detected and its consequences simulated.

In addition, hydrolocation and hydro-dissection can be simulated. Depending on the location of the needle tip in the virtual anatomy, injection of a liquid such as saline via a syringe connected to the needle will result in displacement of tissues near the needle tip. This displacement (or non-displacement) of tissues is one way to confirm (or infirm) that the needle tip is indeed in the right location. In the simulator, the injection of liquid can be simulated, for example, by pressing (longer duration press corresponds to larger liquid injection) on the spacebar of a computer that is part of the simulator or a foot pedal switch (such as a USB foot activated switch) or by instrumenting the syringe to detect movement of the syringe plunger such as via Hall Effect sensors. Based on the location of the needle tip, the 3D visualization may or may not show the effect of a pool of liquid on the adjacent tissues, and, if the US probe is properly placed over the hydrolocation area, the US image also reveals the effect of the hydrolocation. Hydro-dissection is a method where liquid is introduced such that it dissects the interface between two different tissues and it is similarly simulated both in the visualization and in the simulated US image.

Another way to determine if the needle tip is in the right spot is the loss of resistance while tapping the syringe plunger when the needle tip reaches the potential space in which the local anesthetic is to be delivered. The syringe plunger is initially half way up the syringe, i.e., the syringe is half full with air, and when tapping on the plunger if the needle tip is not in the potential space, there is no loss of resistance: the plunger bounces back from the springiness of the trapped air after being tapped. When the tracked needle tip is in the right location in the simulated anatomy, a valve in fluid connection with the syringe opens and allows the air in the syringe to escape, simulating loss of resistance; the plunger now travels down and does not bounce back when tapped. Similarly, if the plunger is pulled back during central venous access CVA (instead of tapped during regional anesthesia), the plunger would not be able to be drawn back if a similar valve was closed. If the valve is opened when the needle tip hits a vein, artery or lung, then the plunger is able to be pulled back. Multiple valves and/or valve settings can be included to simulate different degrees of loss of resistance and plunger movement in order to more effectively simulate the feel of different tissues. In the case of the tip being in the lung, the plunger pulls back but there is no blood flashback.

In some implementations an LED in the syringe can provide cues to the location of the syringe. For example, if the tip is in a vein, an LED hidden inside or next to the syringe lights blue (simulating deoxygenated blood) and if in an artery, an LED lights red to simulate oxygenated blood. A single multi-color LED that changes color based on an electrical signal can be used instead of separate LEDs. In addition, with variable color LEDs, the color of the simulated blood flashback can be modulated to be more subtle, as the color of the flashback is not a reliable indicator of which vessel has been accessed by the needle tip, or to show deoxygenated blood even if an artery has been accidentally accessed if the simulated patient condition is that of oxygen desaturation (low oxygen content in hemoglobin). A multi-color LED can also be used for other feedback purposes: for example, in ultrasound the needle tip may be visible in green LED while the needle shaft is visible in red or yellow LED.

When implementing part of the internal structures, processes, and functions via a virtual model 102, certain of the internal structures can be provided in physical form in the physical model 101. An example of the internal structures being implemented partially by a physical model 101 and partially by a virtual model 102 is a medical simulation where the object or system is a patient and the simulation is of a central venous access (CVA) procedure: a physical model of ribs can be provided inside a cavity of a patient mannequin and the blood vessels and lungs can be implemented virtually. The physical rib provides tactile feedback when the physical needle impinges the physical rib during a simulated procedure. Collapse, breathing, lung slide, hydro-location, hydrodissection or other aspects associated with the lungs of a patient can be simulated via the virtual model 102. The physical anatomy is preferably anatomically authentic. A method to produce anatomically authentic 3D components (virtual or physical) is to derive them from imaging scans (MRI and/or CT, including fused MRI/CT) of actual humans, animals or patients. For the resulting 3D objects, those that need be physically instantiated are obtained via 3D printing.

As an example, to provide the tactile feel of penetrating soft tissue with a needle, a physical, 3D-printed spine may be placed in a 3D-printed mold, and gel such as transparent or opaque ballistic gel may be poured into the mold to create an anatomical block that fits onto a modular stand holding a tracker. As another way to simulate tactile feedback, a "thumper" is created, such as with an off centered vibrator such as those used in cell phones. The thumper is mounted onto the needle and syringe assembly (or other implement held by the user) and provides qualitative tactile feedback equivalent to a "pop" when traversing, for example, a virtual ligament, the wall of a vein or artery, the dura, the ventricle or any fascia or plane that creates a tactile difference when traversing through it. The thumper could also be tuned to simulate what "gritty" tissue feels like when the needle is advanced through tough connective tissue.

Skin may be simulated, for example, by a flesh-toned silicone sheet that mimics the feel of skin and is resistant to repeated needle punctures. The skin is disposable and allows techniques that require skin marking (such as US-assisted thoracic RA) to be practiced. The skin also provides a visual barrier preventing users from directly observing the needle tip after it has penetrated the skin. The 3D printed spine model or other modular anatomy block may have an indexing mechanism to register it a modular stand. The indexing mechanism may be separate or part of the 3D printed block. The modular anatomy block may or may not include a magnetic sensor (6 DOF or less). To facilitate holding the skin onto the modular anatomical block so that it can be quickly removed as needed to directly see below the skin, a skin frame (e.g. as shown in FIG. 7I) that runs around the perimeter of the anatomical block is used to press the skin tightly onto the modular anatomical block. To remove the skin, the skin frame is first removed, allowing the simulated skin to be peeled off the modular anatomical block. In some cases, different thicknesses or types of simulated skin can be exchanged, for example to better simulate the skin anatomy of animals or bariatric patients.

In certain implementations, the particular physical structure representing an internal feature/structure of the object or system provided in the physical form can have an additional virtual representation associated with it. For example, an internal structure can be provided in physical form inside the physical model 101 and a process or function associated with that internal structure can be implemented in the virtual model 102.

A tracked instrument 103 interacts with the physical model 101 in the physical component of the mixed simulation and the virtual model 102 in the virtual component of the mixed simulation. The tracked instrument 103 of the mixed reality system can be a real or fake instrument that is intended to interact with internal features of a physical object represented by the physical model. Tracking of the instrument used to interact with the physical model 101 allows a mirroring of the user's actions in the virtual model 102, and a resulting interaction with the virtual model 102. While a tracked needle is frequently used herein, a tracked instrument 103 may be any instrument or tool that may be used inside the interior, on the surface of or in close proximity to a physical object.

A tracking system 104 is used to monitor a user's actions (through, for example, the tracked instrument 103) and tie the physical actions of the user to the corresponding virtual actions and consequences. The tracking system 104 can be a single system capable of tracking multiple objects or multiple systems for when multiple objects requiring different types of tracking systems need to be tracked.

In a given embodiment, any suitable tracking system 104 can be used to track the user, the display, the physical model, and/or the associated instrument. Examples include tracking fiducial markers, using stereo images to track retro-reflective IR markers, using a magnetic tracking system, or using a marker-less system. The tracking system for the tool or tools and/or physical models can be implemented with commercial off the shelf (COTS) tracking systems such as the Natural Point OptiTrack infrared (IR) tracking system or the Ascension Technology Corporation/NDI 3D Guidance or other magnetic tracking system.

Instrumenting a needle with a tracker sensor and tactile feedback element can result in an unwieldy, fragile, and unrealistic appendage interposed between the needle and the syringe. Advantageously, some embodiments of the subject invention include a tracked instrument 103 having a modular design. For example, embodiments having a tracked needle may use a universal needle hub to facilitate the interoperability of different styles and brands of tracked needle. A universal needle hub has the advantage of allowing different sizes, lengths, and bores of needle stock to be used for different procedures. Furthermore, some needles may contain magnetic materials that, when a sensor is imbedded inside the needle, interfere with magnetic tracking systems. To minimize interference from the needle material, the needle used in the simulated procedure can be made of non-magnetic material.

Figure 9A:
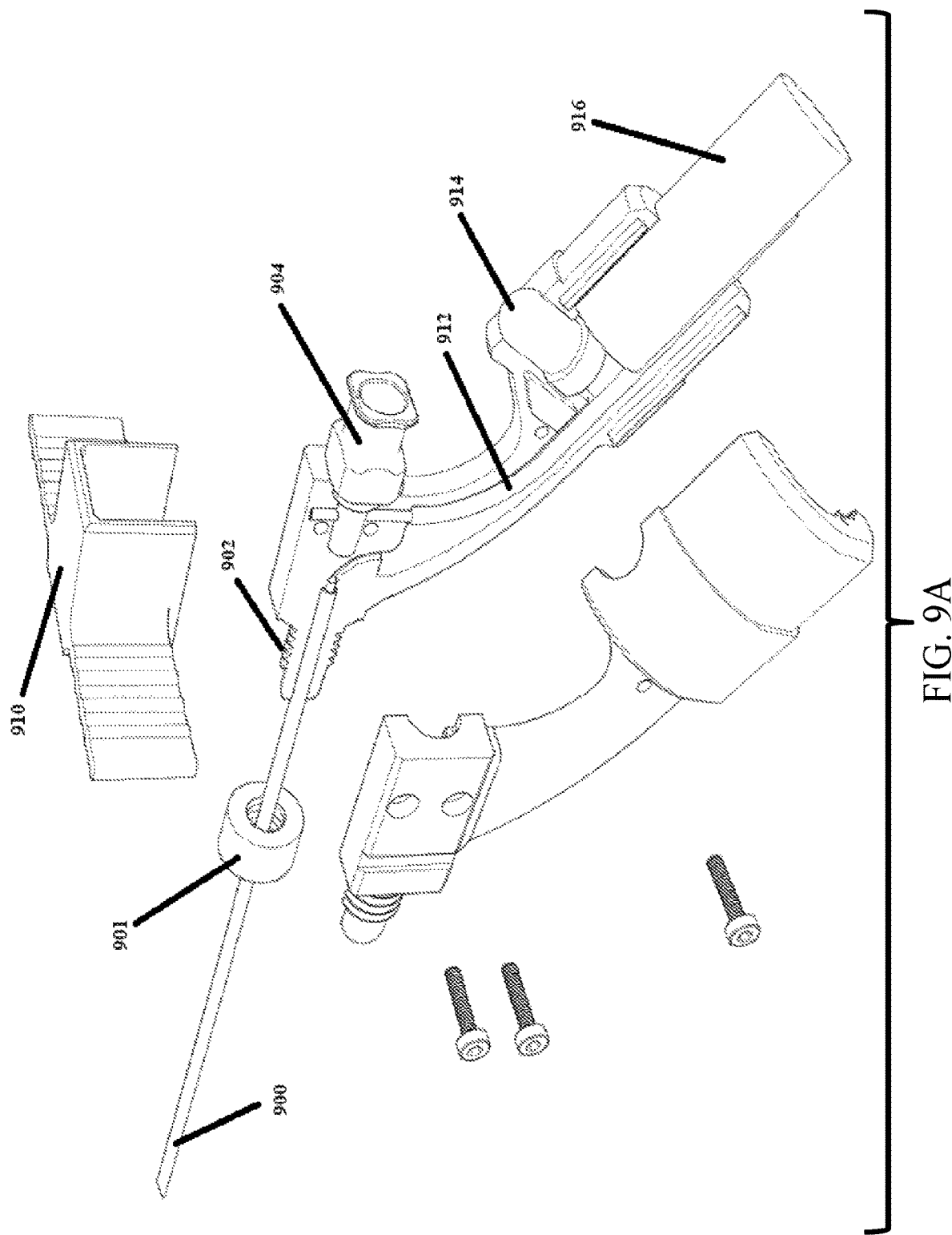
FIGS. 9A-9B show examples of components of a universal needle hub in various perspectives.
Figure 9B:
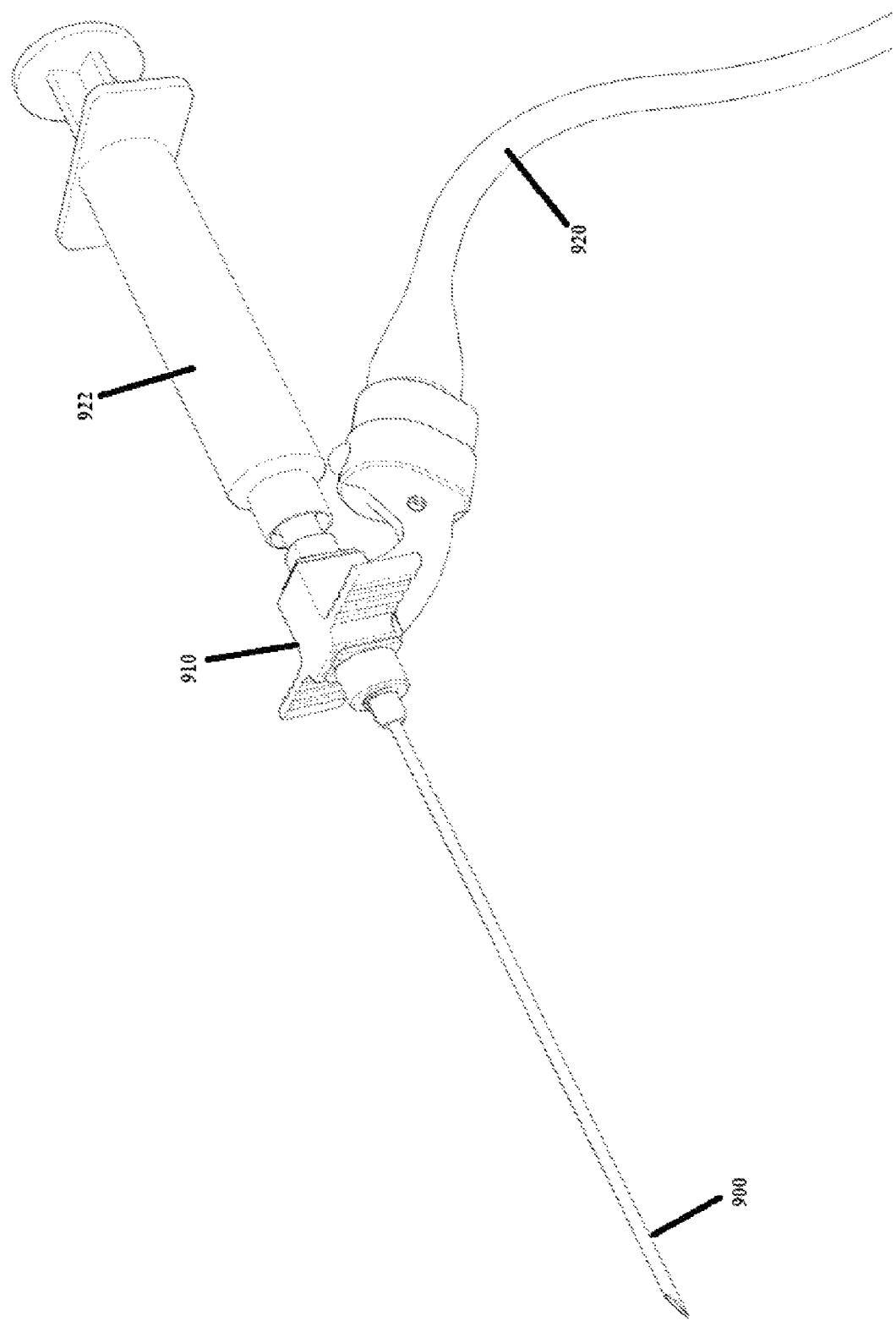

FIGS. 9A-9B show examples of components of a universal needle hub in various perspectives. The universal needle hub can be designed as a clamshell structure that could be manufactured, for example, by additive (e.g., 3D printing) or subtractive (e.g., milling machine) manufacturing techniques. The universal hub clamshell can be split in order to service or replace subcomponents that may be susceptible to wear, such as the tactile unit or needle.

FIG. 9A shows an example of a clamshell design for a universal needle hub. In FIG. 9A, a needle 900 is depicted mounted in the universal needle hub. A threaded collet 902 receives the needle 900 base (opposite end of the needle tip). A nut 901 is placed over the threaded collet 902 and tightened to grab the needle 900 base and create a tracked needle assembly.

In some cases, a compatible syringe connector 904 is located on the universal needle hub that receives a standardized syringe. For example, a Luer-Lok™ connector that is compatible with the Luer-Lok tip of syringes may be present, though other types of syringe connector 904 may be used. The syringe connector 904 can be made as a replaceable insert that is removably attached to the universal needle hub; this has the advantage that as the syringe connector 904 on the universal needle hub wears out from repeated use with metal tipped syringes, only the syringe connector 904 need be replaced without having to replace the entire universal needle hub. Such a design also permits, in some cases, interchangeability with other types, designs, or standards of syringe connector.

In some embodiments, a removable "wing" needle hub handle 910 can be slipped over the hub for replicating the wings found on a regional anesthesia hub; the wing 910 can be removed for central venous access applications.

In some embodiments, the universal needle hub also incorporates pneumatic plumbing/channels 912 that facilitate simulations including loss of resistance or syringe-plunger pull-back. In some cases, the universal needle hub can be connected to a pressurized gas source, a vacuum source, or a quiet electric air pump that can be used for generating pressure or vacuum. This functionality can be used, for example, to physically create the sounds and air currents from the needle tip during simulated procedures (e.g., thoracentesis) that access air pockets. Sometimes, a needle (physical, or a virtual representation, or both) can have centimeter marks so that the needle can be used as a ruler in both the virtual and physical environments.

In some cases, the universal needle hub houses an LED unit 914 containing one or more LEDs that cast light of different hues onto or into the syringe barrel to indicate lung or vessel penetration, as described.

The universal needle hub can contain one or more mechanical motors, servos, or vibration units 916 that can be controlled to provide a tactile sensation when advancing the needle through various simulated or virtual structures for training a user to recognize different kinds of tissues or substances.

FIG. 9B shows an example of the universal needle hub from an alternative perspective. In FIG. 9B, the needle 900 is affixed to the hub with the removable wing 910 attachment for regional anesthesia. A universal needle hub also can contain channels for the wires 920 connecting to the tracking sensor, providing strain relief for the thin and fragile sensor wires. A syringe 922 is also depicted attached to the syringe connector.

In some implementations, the described systems may be used to simulate guidewire introduction for catheterization or other medical or non-medical techniques. An example of using the mixed reality system for guidewire introduction is as follows: when a needle tip is determined to be in the proper location, e.g., inside a vein, a syringe connected to the needle hub may be disconnected while the user makes sure not to inadvertently or accidentally move the needle tip out of the vein while reaching out to grab the guidewire. Any inadvertent movement of the needle tip during the guide wire insertion is detected by the tracking sensor and can be displayed on the 3D visualization; the user can thus be warned and, e.g., penalized in the automated scoring algorithm. The recommended tip (usually a soft tip) of the guide wire is inserted into the universal needle hub and then fed into the needle.

In implementations supporting the guidewire simulation, it is intended to appear to the user as if the guidewire is going into the needle bore, as it would do during an actual medical procedure. In the simulated system, the tracking sensor is occluding the needle bore, therefore the guidewire may make a "U-turn" inside the universal needle hub and be fed into a dedicated channel or the pneumatic channel in connection with the valve or valves that control plunger movement.

As the guidewire is inserted further, the depth of insertion of the guidewire may be tracked by a rotary, optical, or other type of tracking or registration device in the hub; e.g., with the rotary encoder, the guidewire is in contact with a pulley or rotating surface connected to the rotary encoder, translating the linear motion of the guidewire into rotary motion.

Extending the guidewire example scenario for illustration, some embodiments may include two or more physical models (e.g., simulating the identical physical and virtual anatomy or a different physical and virtual anatomy) being used in sequence or simultaneously for teaching different stages of the same procedure. For example, one physical model can be designed to simulate placing in a vein a needle with a modular needle hub and inserting the guidewire while keeping the needle tip in the vein and not accidentally/inadvertently withdrawing the needle tip from the vein or other target. Once this simulated task is complete, the learner moves to a separate physical model designed to simulate using a pre-installed needle with or without a guidewire inside it to eventually place a catheter such as a central line into the vein previously accessed on the first model. A separate needle whose internal bore is patent (hollow, not blocked by a tracking sensor) is used on this second physical block. The needle is tracked, for example, via a tracking sensor positioned on the needle hub. This hub allows a guidewire to be threaded through the needle into the simulated physical model if the guidewire has not already been pre-positioned. As the guidewire is inserted, the depth of the guidewire is tracked by a rotary encoder in a variant of the universal needle hub that rolls as the guidewire moves past it, or an optical encoder. The hub can be tracked with its own sensor to determine if the user failed to hold the hub steady while inserting the guidewire. Once the guidewire is placed, the hub can be removed, and a simulated catheter or central line or port can be threaded over the guidewire with or without the use of an introducer.

In some embodiments, larger tasks may be divided into multi-part tasks or sub-tasks which use more than one mixed reality module and/or arrangement; one module simulates one or more part-tasks or sub-tasks of a complete task by exploiting the virtual component of the mixed/augmented reality system. For, example, to produce a full-mission simulator or full-procedure simulator, the one or more learning/anatomical modules can be used either simultaneously or sequentially; one could be on the modular stand while another is not on a modular stand but within the tracking space/volume of the tracker on the modular stand; two or more could be placed on a shared modular stand sequentially, or two or more could be on modular stands and used simultaneously or sequentially or in any other combination or permutation. Thus it is envisaged that a simulation may use one or more modular stands, and each stand may have one or more anatomical modules.

Many complete procedures/full mission simulators (as opposed to part-task trainers) can be simulated/implemented when using a multiple module system. An example of such a complete procedure is a central venous line (CVL) placement. The procedure can be broken down, for illustration, into broad distinct tasks (by no means an exhaustive CVL sub-task list) such as:

(a) Disinfecting the skin in and around the region where it will be punctured.

(b) Placing the patient in Trendelenburg position (head down with feet higher in elevation than the head; 10-15° incline).

(c) Palpating the pulsating vein with the non-dominant hand and injecting/infiltrating a local anesthetic such as lidocaine via a short 25 gauge needle at the intended catheter insertion site to numb the site.

(d) Puncturing the skin and accessing the vein using anatomical landmarks, assistance from ultrasound imaging and/or guidance from US imaging (the needle is connected to a syringe and the user may gently pull on the syringe plunger to aspirate during the central venous access (CVA) sub-task).

(e) Once the needle tip is determined to be located in the target such as a vein, removing the syringe from the needle.

(f) Inserting a guidewire through the needle bore so that the guidewire tip protrudes from the needle tip and rests within the vein and acts as a placeholder; observe an electrocardiogram (ECG, if present) for signs of arrhythmia.

(g) Removing the needle over the guidewire while ideally keeping the guidewire tip stationary within the target anatomy; a worst case scenario is that the guide wire tip moves and comes out of the vein when the user turns around to pick up a central venous line; and grasping the guide wire with the non-dominant hand at the skin while the needle exits the skin is recommended.

(h) Making a superficial skin incision with a scalpel at the guide wire skin puncture site to make room for the introducer (that is of larger diameter than the needle);

(i) Inserting the introducer over the guide wire 1-2 cm under the skin while holding the introducer close to the introducer tip and rotating the introducer during insertion.

(j) Removing the introducer over the guide wire while the skin and guide wire are grasped at the guide wire insertion site and a 4×4 gauze pad is applied to the site to minimize bleeding.

(k) Placing the usually multi-lumen central venous line (catheter) over the guide wire while keeping track of the distal ends of the catheter; feeding the catheter over the wire until it almost touches, but does not touch, the skin; the wire is then pulled out of the patient's body just enough that its external end emerges on the distal end (end further away from patient) of the catheter and can be grasped.

(l) While grasping the external end of the wire, advancing the catheter over the wire with a rotating motion.

(m) If resistance is felt, repeat from step (g) onwards.

(n) Advancing the catheter until the catheter tip is in the proper position at the junction of the superior vena cava (SVC) and the right atrium.

(o) Removing the guide wire.

(p) Flushing all ports, placing caps on the hubs and securing the central line in place.

(q) Applying a sterile dressing.

(r) Obtaining a chest X-ray to confirm proper placement and location of the catheter tip and that no hemothorax or pneumothorax has occurred.

Steps (a) to (e) or even up to (f) above can be simulated with one module (generally a non-fixed point of entry module) that has a needle with a tracking sensor inside its bore (non-patent bore). Steps (f) to (r) can be simulated with one or more other modules that use a needle with a patent bore because the needle tracking sensor is not inside the needle bore. Once central venous access has been obtained or more precisely, once the user or trainee deems (correctly or incorrectly) that CVA has been obtained, the 3D visualization and needle/anatomy relationship in up to 6 DoF is captured and transferred to another module fitted with a patent needle. That module can be a fixed point of entry module that may consist simply of a needle stuck in a piece of simulated skin covering a hollow enclosure that is instrumented with, for example: channels, rotary sensors and encoders that translate linear motion into rotary motion, optical arrays, Hall effect sensor arrays to determine depth of insertion, grippers (to simulate obstruction to advancement of the needle, guide wire, introducer and catheter), optical sensors, arrays of optical emitter detector pairs, potentiometers, tracking sensors, etc. The instrumentation may help to determine depth of guide wire, introducer, and catheter insertion as well as other CVL placement techniques and skills, etc., to determine depth of insertion and other CVL placement performance metrics and create obstacles (such as inability to advance needle, guide wire, introducer or catheter) as needed.

When the user transfers from module A (non-fixed point of entry simulator with non-patent tracked needle bore) over to module B (a fixed point of entry module with patent needle bore), the 3D virtual environment (including needle position and orientation and placement relative to anatomy) is transferred from module A to module B. The virtual environment is positioned in module B so that it is centered in up to 6 degrees of freedom (DOF) around the patent needle in module B inserted at the fixed point of entry, so as to reproduce the needle/anatomy relationship attained on module A; thus, module B may be preferably hollow and devoid of physical anatomical landmarks so that the virtual anatomy can be centered around the needle and reproduce the needle/anatomy relationship that was in effect at the time that module A was left to continue the simulation on module B. The transfer of the anatomy/needle (or other instrument) relationship is implemented, among other ways, by transferring the coordinates of the needle in up to 6 DOF from module A to module B using a coordinate system (with up to 6 DOF) shared between modules A and at least one other module B.

In one implementation, a magnetic 6 DOF sensor attached to the hub of the patent needle B in module B can be used in a needle A-to-B transfer and alignment step which helps replicate the needle position in module A. The position and orientation of the needle A in module A is displayed in the virtual environment as a phantom. The position and orientation of needle B is displayed in real time as a virtual needle. The user or proctor can observe the phantom of needle A and the virtual representation of needle B as a real time graphical alignment tool as he or she moves the tracked needle hub B to match its position in the virtual environment. Alternatively, a set of coordinates defining needle A position and orientation is displayed on the computer screen. As the user manually adjusts the position and orientation of needle B, the coordinate numbers update in real time and show green when the coordinate of needle B matches the corresponding coordinate of needle A. If the user incorrectly judged that the needle was in the vein when it actually was not, this mistake is faithfully transferred to module B.

Embodiments of the subject invention including modularity, a 3D virtual environment and 3D visualization thus allows the system to provide the benefits of non-fixed point of entry simulators as well of those of fixed point of entry simulators.

Steps/tasks of the CVL procedure outlined above are described below in the context of modular embodiments. These procedural examples are not intended to limit the subject matter to only the described modules or the CVL procedure.

Step (a)—Skin prepping. The procedure begins by disinfecting the area where skin puncture/incision will occur. Attaching, such as through quick snap clips, readily re-re-assignable spare tracking sensors to one or more physical skin prep applicators of different sizes allows tracking of the skin prepping technique and grading the technique on such factors as: time duration of actual scrubbing (at least 30 seconds), scrubbing pattern (to and fro, spiral centered on proposed incision/skin puncture site, etc.), coverage of the skin with skin prep solution in 1, 2, 3 and 4 orthogonal directions, confirming that the size of the applicator selected is commensurate for the task (not too big, not too small), time elapsed between scrubbing and application of drapes (draping) which should be at least 3 minutes to let alcohol in the skin prep solution (chlorhexidine in 70% isopropyl alcohol) evaporate to reduce the risk of surgical fires. This can be simulated, for example, on a CVA anatomical module. Skin prepping can be simulated by snapping a tracking sensor on a snap-on clip to a pre-positioned snap receptacle common to a set of skin prep applicators of different sizes. Each unique applicator size is laid out in a tray with enough spatial separation between applicators so that it can be determined from the tracking sensor on the snap-on clip which applicator size the user selected by snapping the snap-on clip onto it. Alternatively, the applicators can each have tracking sensors or have proximity switches below them that change status when the applicator above or near to the proximity switch is removed (i.e., selected).

Step (b)—Trendelenburg position. The patient is placed in Trendelenburg position so that the risk of air embolism is reduced, and the veins are engorged and present larger targets that are easier to access by inserting a needle tip inside the vein (central venous access, CVA, a sub-task of CVL placement). Proper Trendelenburg position can be monitored through the modular stand, as previously discussed. Position and orientation of the anatomical block, such as Trendelenburg position, is detected in multiple ways including having a tracking sensor on the anatomical block, or, in the case of an anatomical block without a tracking sensor, inferring the position and orientation of an anatomical block with a rigidly coupled tracker from the position and orientation relationship of the block relative to the plane of the tray holding the tracked tools (needle, TUI, probe) when they sit within the tray lying on the table or a common surface or plane that also holds the base of the modular stand.

Step (c)—palpation and injection of local anesthetic. Tracking of palpation technique can be done via a wearable tracking sensor that slips over a finger of the user, allowing the simulator to determine if the palpation is being applied to the right location. A palpable pulse may also be located on the assembly housing that is wearable on the finger; if the finger is tracked to be at the correct anatomical location and a palpable pulse should be felt, then the mechanism for generating a palpable pulse, such as a piece of flexible hose with compressed air admitted to it via a valve cycling on and off at a frequency that simulates a heartbeat, is activated.

Local anesthetic injection is simulated via a short very small bore needle. The tracking sensor is not placed in the needle bore in the case of the local anesthetic needle because the bore is too small. Instead, as already described, the TUI can be fitted with a tip that simulates a short, 25 ga local anesthetic needle that can be tracked; this can be effective because the needle is short and the needle tip is placed just below the skin and not too deep, allowing tracking via a sensor that is not at or near the needle tip such as a tracking sensor near the TUI tip.

Step (d)—Central venous access. The technique of simulating CVA is described elsewhere herein.

Step (e)—disconnecting the syringe from the needle. Implementations of the universal needle hub can accept multiple syringe types (e.g., Luer-Lok tip and slip fit syringes). The syringe may also be fitted with a tracking sensor to determine its location and whether it is disconnected from the needle. Upon venous access, a small amount blood leakage is simulated on the skin on the 3D visualization at the site where the needle punctures the skin. The vein is flexible and indents or tents and a small tactile pop may be felt when the needle punctures the vein wall. This tactile feedback can be physically simulated via the tactile element built into the universal needle hub. During disconnection of the syringe from the needle prior to the insertion of the guide wire, the 3D visualization shows drops of blood dripping from the needle hub when the needle tip remains in the vein and does not show drops of blood dripping when the needle tip has accidentally moved from the vein, was never in the vein to begin with or is not in the vein. If the needle tip is in the artery, pulsatile flow of blood out of the hub can be simulated on the 3D visualization. The color of the blood in the 3D visualization and from the multi-hue LED illuminating the syringe to simulate the blood flashback color cannot be relied upon to determine if the vein or artery have been accessed. Via a UI on the computer screen, the simulation allows simulated connection of the central line to a pressure sensing system that displays a simulated dynamic blood pressure waveform and blood pressure numbers such as systolic, diastolic, mean blood pressures and heart rate in real time on the computer screen. As an example, blood pressure higher than 30 mm Hg or a pulsatile blood pressure waveform indicate arterial, instead of venous, access. What is simulated is based on where the needle tip is located. Procedurally, transduction of blood pressure should be done before a guide wire is introduced, if in doubt. If arterial puncture has occurred, the user/trainee has to apply firm pressure for 10 minutes on the site; this can be tracked by the wearable finger sensor with embedded FSR on the wearable assembly.

Step (f), inserting a guide wire in the needle bore, is not possible when there is a magnetic tracking sensor in the bore of the simulated needle that presents a mechanical obstruction that prevents physically inserting a guide wire through the entire length of the needle bore. Advantageously, the use of multiple modules allows use of a needle with a patent bore for the sub-tasks that require an unobstructed needle bore. An ECG is emulated and displayed in real time on the computer screen, and displays arrhythmias when the guide wire has reached the heart. The user then withdraws the guide wire until the simulated arrhythmias cease. The depth of insertion of the guide wire and the location of the physical tip of the guide wire is tracked, e.g., via optical sensors, rotary encoders, Hall effect sensors, or by magnetic, capacitive, or inductive means, etc., as previously mentioned. An example implementation uses a translucent tube or channel that can accept the guide wire, the introducer and the catheter. An array of optical emitter-detector pairs (preferably transmissive, but they can also be reflective) is placed along the sides of the translucent channel The optical emitter detector pairs are placed as closely as possible side by side and emit an optical beam that is perpendicular to the channel axis. When a guide wire, introducer or catheter is advanced by the user, it is routed into the channel via a receiving funnel that is centered on the position of the pre-positioned patent needle. The opacity of the guide wire, introducer, or catheter breaks the optical beam and thus allows detection of the location of the tip of the advanced item (and thus the depth of insertion). The tip is where the series of obstructed or attenuated emitter-detector beams ends or the reflected optical beam has a step change in light reflected back. The proximity of the emitter detector pairs sets the linear measurement resolution of depth of insertion. The channel is of a length to physically simulate at least the typical length to the junction of the SVC and right atrium and thus readily accommodate the entire length of any size of guide wire or central line catheter. An array of Hall effect sensors, magnetic switches or magnetic, capacitive, or inductive sensors along the receiving channel can also be used to detect the depth of insertion of the metallic guide wire. A wireless tracking sensor in the guidewire could replace the wired sensor in all applications where a tracking sensor is used.

Step (g)—removing the needle over the guide wire. Grasping the guide wire with the non-dominant hand at the skin while the needle exits the skin is recommended and can be tracked by placing one or more wearable finger sensor(s) on the non-dominant hand or the relevant fingers. The movement of the guide wire during needle withdrawal can be monitored and graded via the insertion depth sensor.

Step (h)—skin incision. In some cases, this step can be omitted in the mixed reality simulator by judicious choice of simulated skin material; a soft, lifelike, springy and self-sealing material will be able to distend and accept the larger introducer without needing an incision so that the cost of ownership of the simulator is reduced by allowing the simulated skin to be reused multiple times rather than having to discard the simulated skin after skin incisions. Alternatively, a scalpel can be simulated by using a scalpel tip on the TUI and tracking the scalpel blade to assess technique.

Step (i)—inserting the introducer over the guide wire. The introducer is fitted with a tracking sensor (outside of the introducer bore) that can verify that the introducer is inserted 1-2 cm into the skin and is rotated during insertion. Alternatively, or in addition, the introducer may be thicker than the guide wire and will therefore obstruct more of the optical beam of a transmissive optical emitter detector pair than the guide wire. Thus, the location of the tip of the introducer (and hence the depth of insertion) when it is inserted over the guide wire in module B is determined by the step change from very low optical transmission to higher but still attenuated transmission. The location of the tip of the guide wire is determined by the change from higher but still attenuated transmission to no attenuation.

Step (j)—removing the introducer over the guide wire. Increased bleeding can be shown on the 3D visualization, which can be reduced if the skin and guide wire is grasped at the guide wire insertion site and a 4×4 gauze pad is applied to the site. A physical gauze pad can be fitted with a sensor and, if picked up and applied by the user, it can be shown and simulated in the 3D visualization. The rate of bleeding can be modulated in the 3D visualization depending on the technique of the user that is being monitored in real time.

Step (k)—placing the catheter over the guide wire. The catheter is tracked with a sensor or sensors so that it can be verified that the catheter is being rotated while being advanced and that the distal end of the catheter is being properly managed. Alternatively, or in addition, the catheter is thicker than the guide wire and will therefore obstruct more of the optical beam of a transmissive optical emitter detector pair than the guide wire. Thus the location of the tip of the catheter (and hence the depth of insertion) when it is inserted over the guide wire in module B is determined by the step change from very low optical transmission to higher but still attenuated transmission. The location of the tip of the guide wire is determined by the change from higher but still attenuated transmission to no attenuation. In this way, it can be determined if the tip of the guidewire is indeed protruding from the distal tip of the catheter so that the external tip of the guidewire can be grasped. In step (k) and afterwards, if the simulated ECG shows signs of arrhythmia, the central line tip may have inadvertently migrated to the heart and needs to be pulled back in the simulation. When the catheter is sufficiently pulled back to be out of the heart in the simulation, the arrhythmias simulated on the simulated ECG disappear.

Step (l)—advancing the catheter. The catheter's tracking sensor outside the catheter bore (such as imbedded inside the wall of the catheter near the catheter tip) allows tracking of catheter insertion depth and catheter rotation while advancing and provides tracking feedback to generate arrhythmias if inserted too far.

Step (m)—resistance to guidewire or catheter advancement. This step can be simulated and uses the same hardware and software as for the previous steps. If the needle tip has indeed moved, the guidewire will not pass through the needle during the simulation. The user will have to re-assess the position of the needle through adjustment of the needle position and aspiration or other means. This can be tracked in the simulation.

Step (n): advance the catheter until the catheter tip is in the proper position. The location of the catheter tip is determined by a sensor near the catheter tip embedded in the catheter wall and/or by the array of optical emitter detector pairs. The channel is long enough to allow users to advance the catheter too far into the heart so that arrhythmia-inducing conditions may be simulated.

Step (o)—remove the guide wire. The array of Hall effect sensors, magnetic, capacitive, inductive, or optical emitter-detector pairs can detect withdrawal of the guide wire.

Step (r), chest X-ray, can be simulated via a library of different radiographs related to CVL placement, depth of CVL placement, known and common errors and complications in CVL placement such as pneumothorax and arterial puncture; a chest X-ray can be initiated in the simulation via a UI on the computer screen at all times during the procedure.

Advantageously, embodiments of the subject invention allow simulation or tracking of most, if not all, of the learning objectives and techniques described above. All the elements being performed the proper way and in the right sequence can be simulated, tracked and graded in the current invention. Module B inherits the position and orientation of module A if the same modular stand is used and is not adjusted while swapping modules. If the same modular stand is not used, the modular stand in module B is made to have the same orientation and position as module A. This can be accomplished manually using a set of coordinates defining modular stand position and orientation displayed on the computer screen. As the user manually adjusts the position and orientation of the modular stand base, the coordinate numbers update in real time and show green when the coordinate in module B matches the corresponding coordinate in module A. Alternatively, on the 3D visualization, a phantom of modular stand A in its last position and orientation can be shown as well as a virtual representation of module B while the user adjusts module B to be in the same position as module A. The user can use the phantom of module A and the real time virtual position of module B to guide module B into the same orientation and position as module A. Additionally, if the user placed the needle in module A in a lateral position while the pre-positioned fixed point of entry needle is in the middle of module B (midline), this can be somewhat hidden from the user by draping of the procedural site at module B so that it is not evident that the needle is not in the same position on the physical block of module B.

Figure 8:
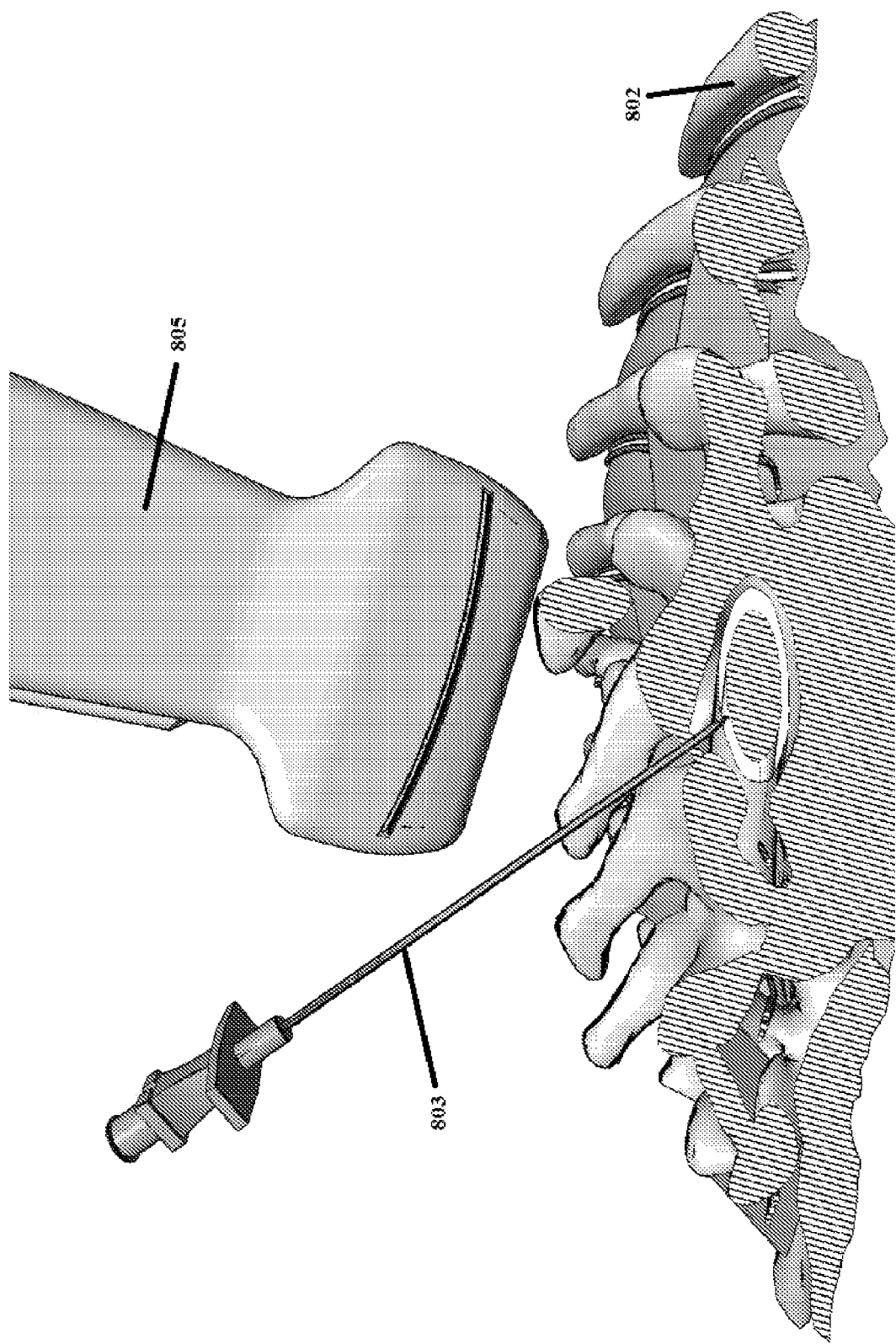
FIG. 8 depicts an example 3D/Cross Section hybrid view as a tracked instrument interacts with the imaging plane of an imaging (e.g., ultrasound) probe.

The virtual model 102 can include a simplified or extended representation of an object and can include features on a cut-out, cross-sectional, simplified, schematic, iconic, exaggerated, surface, sub-system, organ, functional blocks, structural blocks or groups, cellular, molecular, atomic, and sub-atomic level. The cut out view can include a view where the "back half" of the object is in 3D and the intersection of a cutting or imaging plane is shown in cross section. FIG. 8 depicts an example 3D/Cross Section hybrid view as a tracked instrument (103) interacts with the imaging plane of an imaging (e.g., ultrasound) probe 105.

Virtual model 102 representations include, but are not limited to, inner workings of a selected object or region and can include multiple levels of detail such as surface, sub-system, organ, functional blocks, structural blocks or groups, cellular, molecular, atomic, and sub-atomic representations of the object or region. The representations can also include images typically achieved through medical or other imaging techniques, such as ultrasound scans, X-rays including fluoroscopy, MRI, and CT. Input for a simulated ultrasound image or other medical image may be provided via a tracked ultrasound probe 105 or by re-purposing a tracked imaging probe as a TUI for any other medical imaging implement such as fluoroscopy. In some cases, the TUI can be fitted with a universal adapter tip that accepts different tips. The type of TUI tip attached to the TUI is auto-detected thru sensors or by user entry through a screen user interface, for example, a Luer tip, ruler, laser pointer, T-square, level, protractor, inclinometer, marker (virtual or physical). The interface may allow a user to touch point A then touch point B (or more points) and it computes distance AB, elevation difference AB and generally how AB varies such as the AB difference for the 6 DOF. The Luer tip can accept a very short needle to simulate, e.g., local anesthetic injection. Software would then evaluate and grade the local anesthetic technique.

The virtual model can be single objects with familiar regular shapes, including 3D shapes such as cones, spheres, cylinders, cubes, and pyramids with different numbers of sides, as well as more complex objects where two or more single objects are attached (joined at the surface) to each other or nested (or penetrate) within each other. The physical model could be simply a block of gel that can be pierced with a needle. The block of gel could have nothing in it, as when the regular shapes are all virtual, or the block of gel could have the equivalent of a physical obstacle course embedded in it, especially when tactile feedback from the physical needle impinging a physical obstacle is desirable. The gel or physical component could have an indexing component that registers it to the modular mount or stand.

Figure 1B:
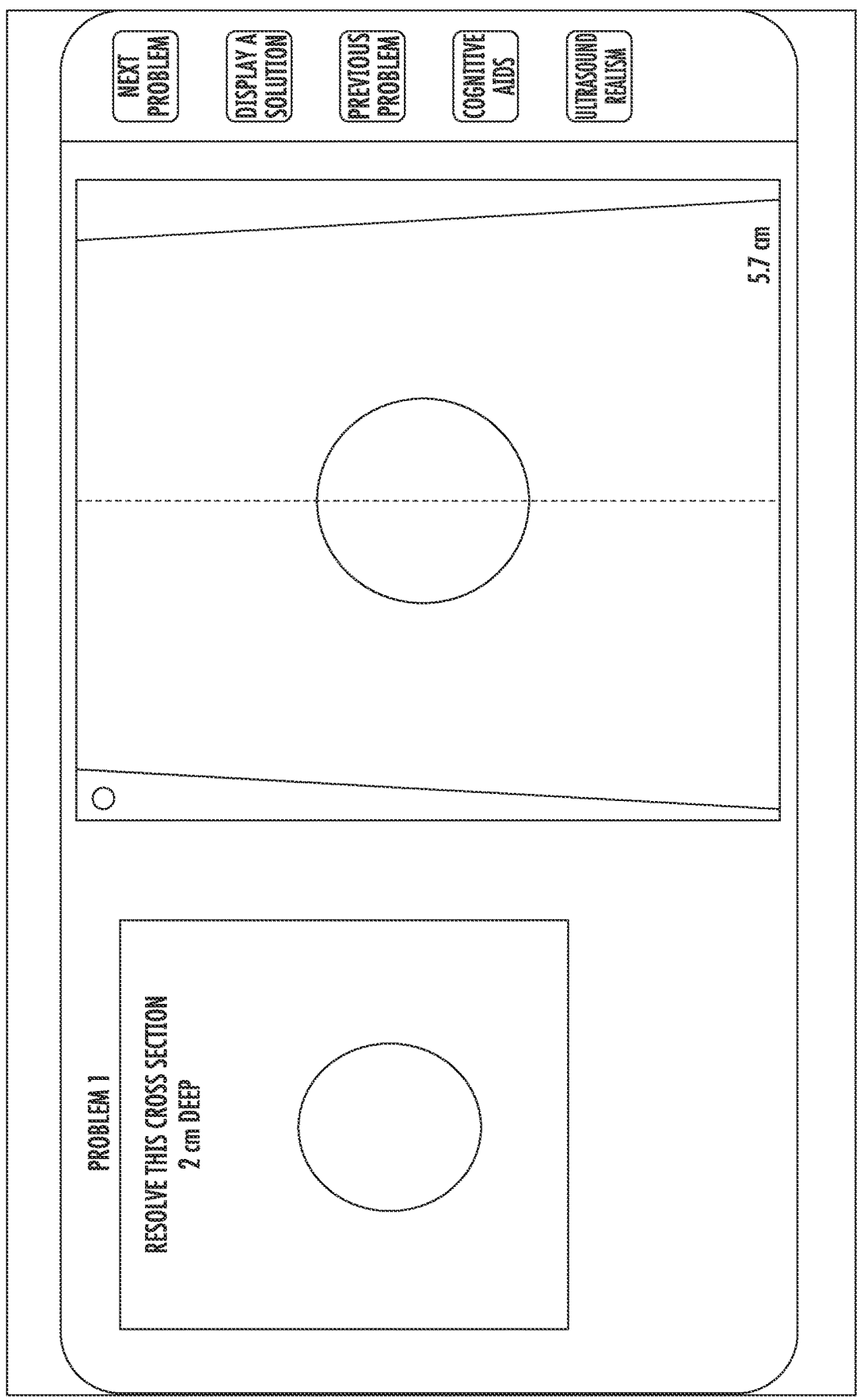
Figure 1C:
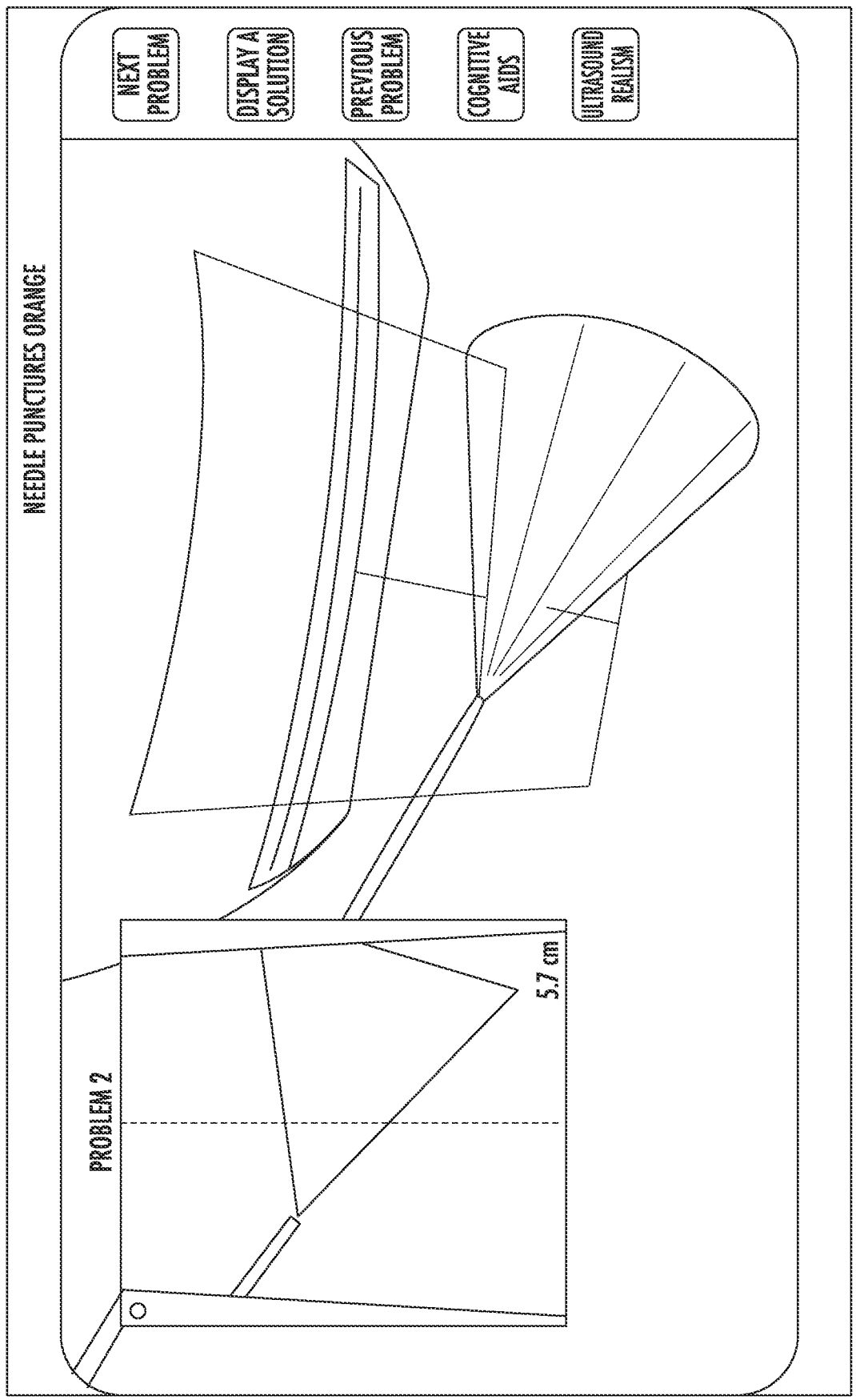

Regular virtual objects may advantageously be used in some embodiments to teach cross-sectional literacy to healthcare personnel who may not have had formal training in cross-sections as engineering students do and who need to acquire cross-sectional literacy in order to properly image, interpret, assist and guide instruments using imaging modalities that produce 2D cross-sections. In some cases, learners may be asked to use the tracked imaging probe and later the tracked needle to perform a set of gradually harder exercises with the regular shapes without having to simultaneously deal with the challenge of actual anatomy that may be unfamiliar to novices. The ultrasonography and cross-sectional literacy trainer is thus a procedure-agnostic trainer, as it does not focus on a particular anatomy and uses regular 3D objects. Another reason to use regular 3D objects is that they are familiar and they also have reference planes such as bases and planes of symmetry that can be absent in anatomical structures. An example of a simulation exercise is shown in FIGS. 1B and 1C, which depicts the challenge of guiding the tip of a physical needle to the tip of a virtual cone.

The virtual model 102 may gather input from the tracking system 104, ultrasound or other medical imaging probe or implement 105, the tracked instrument 103, and physical model 101, to implement and render display interfaces with the various indicators and cognitive aids disclosed herein. The virtual model can be rendered as a 3D, real-time, color-coded visualization on a screen or monitor of a display 106. In some cases, the visualization can include labels for each of the anatomical parts and internal organs, vessels, etc. The labels can be toggled on and off either manually or automatically (e.g., when running an assessment exercise, where the labels would provide unwanted cues). The labels could also be toggled on and off on the simulated US image or other medical image such as fluoroscopy. Virtual marks can also be placed on the virtual skin or other anatomical parts (including internal structures, organs, vessels, etc.) via the TUI or other pointing device. The display device 106 can be mobile, such as a computer tablet, or stationary, such as a computer or television screen. The perspective of the 3D visualization can be directly and manually adjusted via a tracked tangible user interface (TUI) for controlling the position and orientation of the visualization virtual camera.

Computing system 110 may implement one or more modules or components, including tracking system 104, virtual model 102, visualization 109 and display 106. Computing system 110 can be an instantiation of a computing system 600 having a storage system, a processing system, and input/output devices as described with respect to FIG. 6A.

In some cases, as when the system is being used to simulate a procedure instead of assist in an actual procedure, a simulation module (which may be stored on a computer readable medium and contain computer readable instructions for the simulation or visualization) can be used to select the particular virtual model, within a virtual model library, being used for the simulation. In addition, the simulation module, in conjunction with the tracking system 104, can provide a corresponding interaction with the virtual model 102 (and consequences of that action) when the tracked instrument 103 is being interacted with the physical model 101. The simulation module accesses the registered virtual model to tie the physical actions of the user to the virtual model 102. The visualization can be displayed in real time within view of the user or stored for delayed viewing at a nearby or distant location in view of a person or instructor(s) monitoring or grading a simulation.

Figure 2:
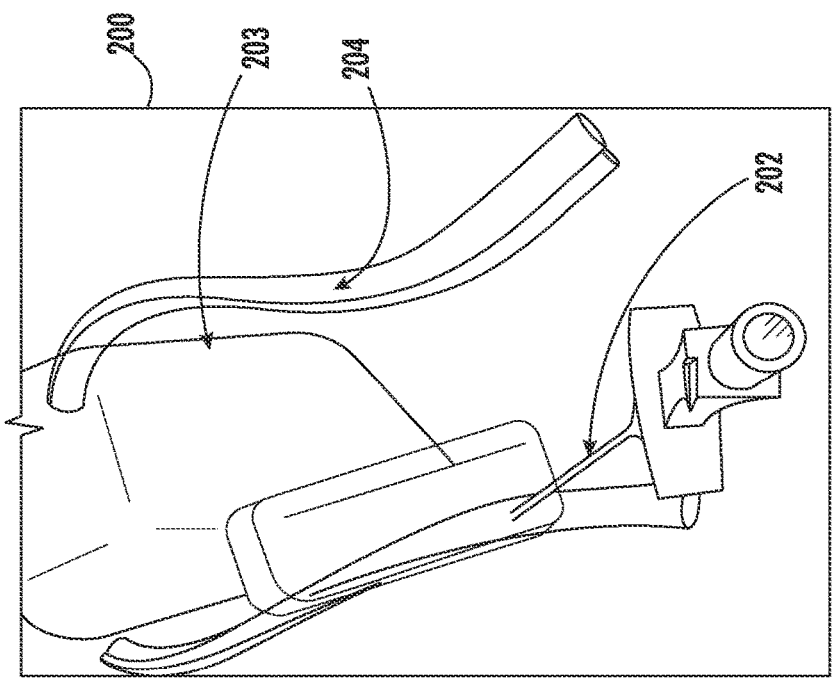
FIG. 2 shows an example of certain interfaces in the virtual environment of a system implementing the described techniques.
Figure 2:
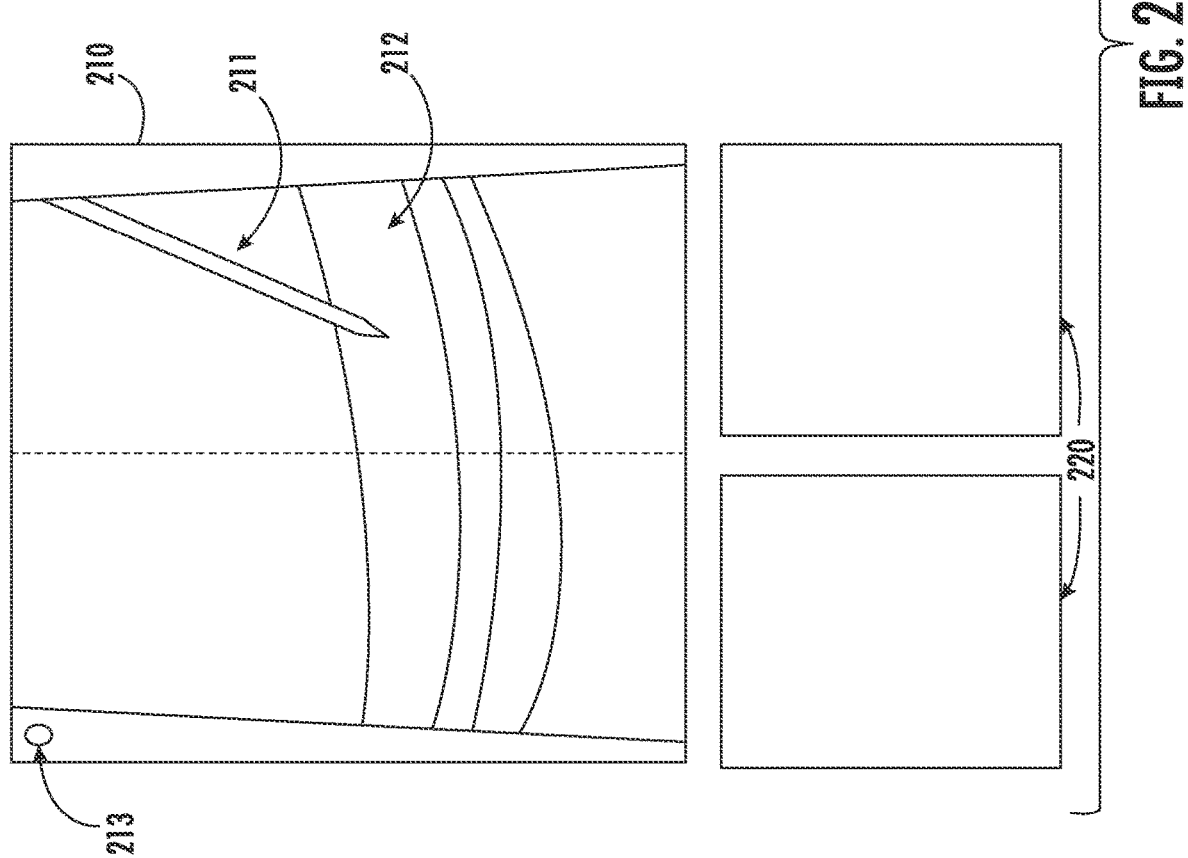

FIG. 2 shows an example of certain interfaces in the virtual environment of a system implementing the described techniques. The example in FIG. 2 shows aspects of an ultrasound-guided needle insertion in the region of blood vessels leading to the head. In FIG. 2, virtual rendering 200 shows the virtual model with a virtual ultrasound probe 203, virtual needle 202, and rendered or visualized anatomy containing blood vessels 204 near the head. The virtual model is a visualization of the physical ultrasound probe and physical needle (i.e., the physical model) being directly handled by the user without a mediated user interface. The movements of the user in the physical model (not shown), such as the position and orientation of the physical ultrasound probe and needle, are tracked via tracking sensors in the physical ultrasound probe and needle. Via information from the tracking sensors, the position and orientation of the virtual ultrasound probe 203 and needle 202 in the virtual model reflect the position and orientation (up to 6 DOF) of the physical ultrasound probe and needle in the physical model. There is a tactile landmark on only one side of actual US probes that is replicated in the simulated US probe. There is a dot in actual US images (corresponding to the side where the tactile landmark is) to inform the user on which side of the US image the tactile landmark is. That feature is replicated in US image 210 in the form of dot 213.

FIG. 2 also shows an ultrasound image 210 of the ultrasound probe output from the physical model. In a simulation environment, the ultrasound display 210 may show in real time a 2D image based on the intersection of the insonation plane with the virtual 3D model that simulates an US image. In an actual usage environment with a real US probe, the ultrasound image 210 may reflect actual results from the body or object being insonated or imaged. In the ultrasound image 210, the needle shaft 211 is plainly visible. In the example ultrasound image, the user is holding the needle "in plane" so that the entire shaft, including the tip, of the needle 211 is visible in the ultrasound image. The blood vessels of the neck 212 are also visible in the ultrasound image. Also shown is an example of an indicator placement 220 on the display of a combined physical and virtual (mixed reality) system. Various kinds of the indicators disclosed herein may enhance or supplement display elements in the virtual model of the system. It should be noted that, while two indicator placements 220 are shown for illustration, any number of indicators may be relevant or appropriate to a given usage scenario or procedure. It is to be understood that while an US probe is used as concrete example, the technique described is generally applicable to all other imaging techniques such as fluoroscopy. In some cases, a simulated US or fluoroscopic image is generated in real time, "on the fly", using a standard notebook computer with a standard graphics card instead of using a library of predetermined images that were previously captured.

FIGS. 3A-3E show example implementations of an in-plane indicator as disclosed herein. Examples illustrate ultrasonography, though other types of medical imaging may be used. Representations of the insonating plane line and needle line are shown in FIGS. 3A-3E to indicate various placements of the needle and ultrasound probe with respect to one another. The level of contact between the lines (i.e., the number of contact points and the position of the contact points) indicate the relationship between the needle or other tracked instrument and the insonating plane. In each of FIGS. 3A-3E, the in-plane indicator is a virtual rendering akin to a camera that looks down the ultrasound probe's insonating plane from the top.

Figure 3A:
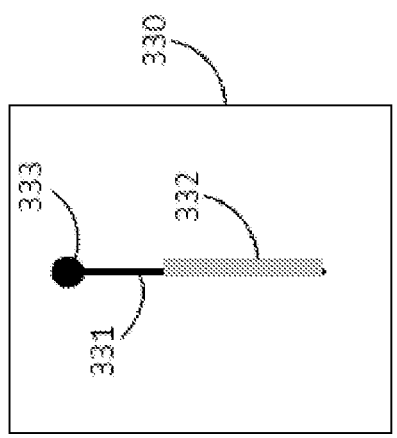
FIGS. 3A-3C show example implementations of an in-plane indicator and FIGS. 3D-3E show example implementations of an out-of-plane indicator.

In FIG. 3A, the in-plane indicator 330 shows perfect alignment and orientation between the needle and the insonating plane of the ultrasound probe. The insonating plane is rendered as an insonating plane line 331, since two-dimensional planes become lines when viewed edge-on. A section of the needle, rendered in indicator 330 as needle line 332, overlaps the insonating plane line 331, giving the impression of a single coincident line to indicate that the needle is in a perfect alignment and thus viewing relationship to the insonating plane. A coincident or overlapping insonating plane line 331 and needle line 332 indicate the perfect alignment and orientation of the probe's insonation plane and needle axis with respect to needle detection and importantly needle tip detection.

An ultrasound probe orientation dot 333 can be placed at the top of the insonating plane line 331 to show the location of the ultrasound probe orientation tactile notch/ridge 204 (FIG. 2).

Figure 3B:
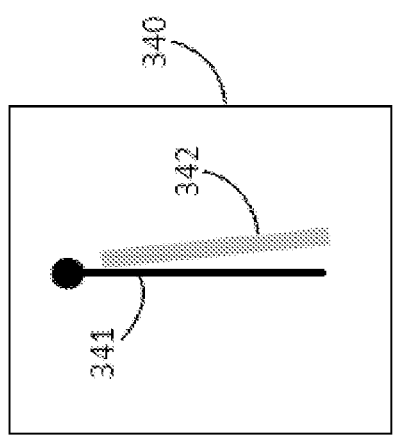

In FIG. 3B, the in-plane indicator 340 shows misalignment of the ultrasound probe and needle such that the needle is not visible or detectable at all to the ultrasound probe. The misalignment is indicated by the fact that there is no overlap between or intersection of the insonating plane line 341 and the needle line 342. The needle is close to the probe, indicated by the nearness of the needle line 342 to the insonating plane line 341. The position of the ultrasound probe with respect to the needle may also be indicated by the relationship of the lines to one another in the in-plane indicator. In the particular example in this figure, the in-plane indicator informs the user that the ultrasound probe should be moved slightly to the right and rotated slightly counterclockwise to make the lines parallel and overlapping (as shown, for example, in FIG. 3A).

Figure 3C:
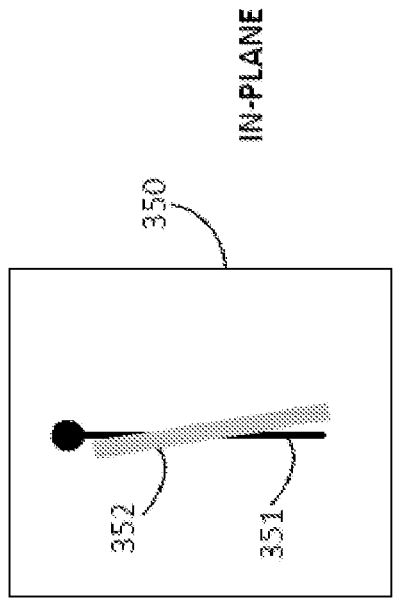

FIG. 3C shows the in-plane indicator 350 when an ultrasound probe and needle are oriented such that the probe's insonating plane can see part of the shaft of the needle, but not the tip. This positioning is indicated by the intersection of the insonating plane 351 with the middle (not the tip) of the needle line 352. In this particular misalignment, the ultrasound image might show the same or similar representation as in FIG. 2, even though the tip of the needle is unseen. Advantageously, the disclosed in-plane indicator can be helpful in avoiding an undesirable adverse event, such as a pneumothorax, when the needle tip punctures a lung due to apparent but false visibility of the needle "tip" because the actual tip protrudes past where the needle exits the insonation plane.

In some uses of ultrasound imaging, the "out-of-plane" technique is most appropriate or desirable for visualization of the needle. In a perfect out-of-plane technique, the tip of the needle is represented as a single dot on the ultrasound display, where the insonating plane transverses the very tip of, and is perpendicular to, the needle shaft. Using an ultrasound image alone during an out-of-plane technique, it would be difficult to discern the difference between an insonation plane that traverses the needle mid-shaft, versus one that traverses the needle tip. However, the disclosed in-plane indicator provides a visualization of the placement of the needle with respect to the insonating plane during out-of-plane technique, e.g., for trainees and instructors.

Figure 3D:
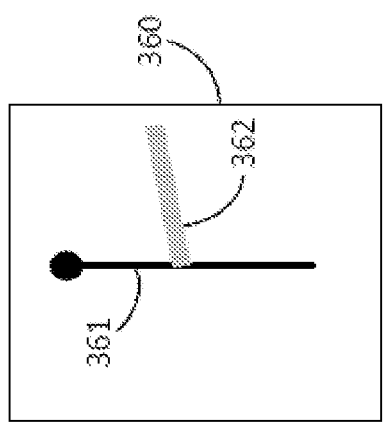

In FIG. 3D, the in-plane indicator 360 shows a near-perfect out-of-plane technique. The insonating plane line 361 is at a nearly 90 degree angle to the needle line 362, intersecting the tip of the needle line 362 to show that the position of the tip, a white dot on the simulated ultrasound display, is known. Perfect out-of-plane technique, while not shown here, would be indicated by a right angle between the insonating plane line 361 and the needle line 362, with the tip of the needle line forming a right angle tee.

Figure 3E:
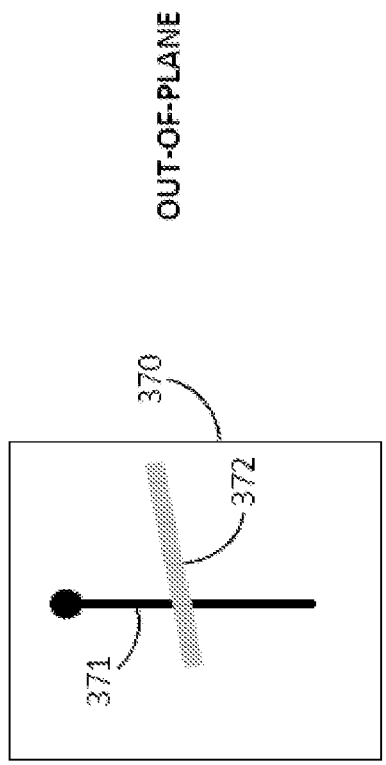

In FIG. 3E, the in-plane indicator 370 shows a misalignment of the ultrasound probe with respect to the tip of the needle. The misalignment is indicated by the crossing of the insonating plane line 371 by the needle line 372 mid-shaft. As noted, it would be difficult to discern the difference between the ultrasound probe/needle placements in FIGS. 3D and 3E using an ultrasound display alone, as the ultrasound display in both placements would show a single dot indicating the needle during out-of-plane technique.

Figure 3F:
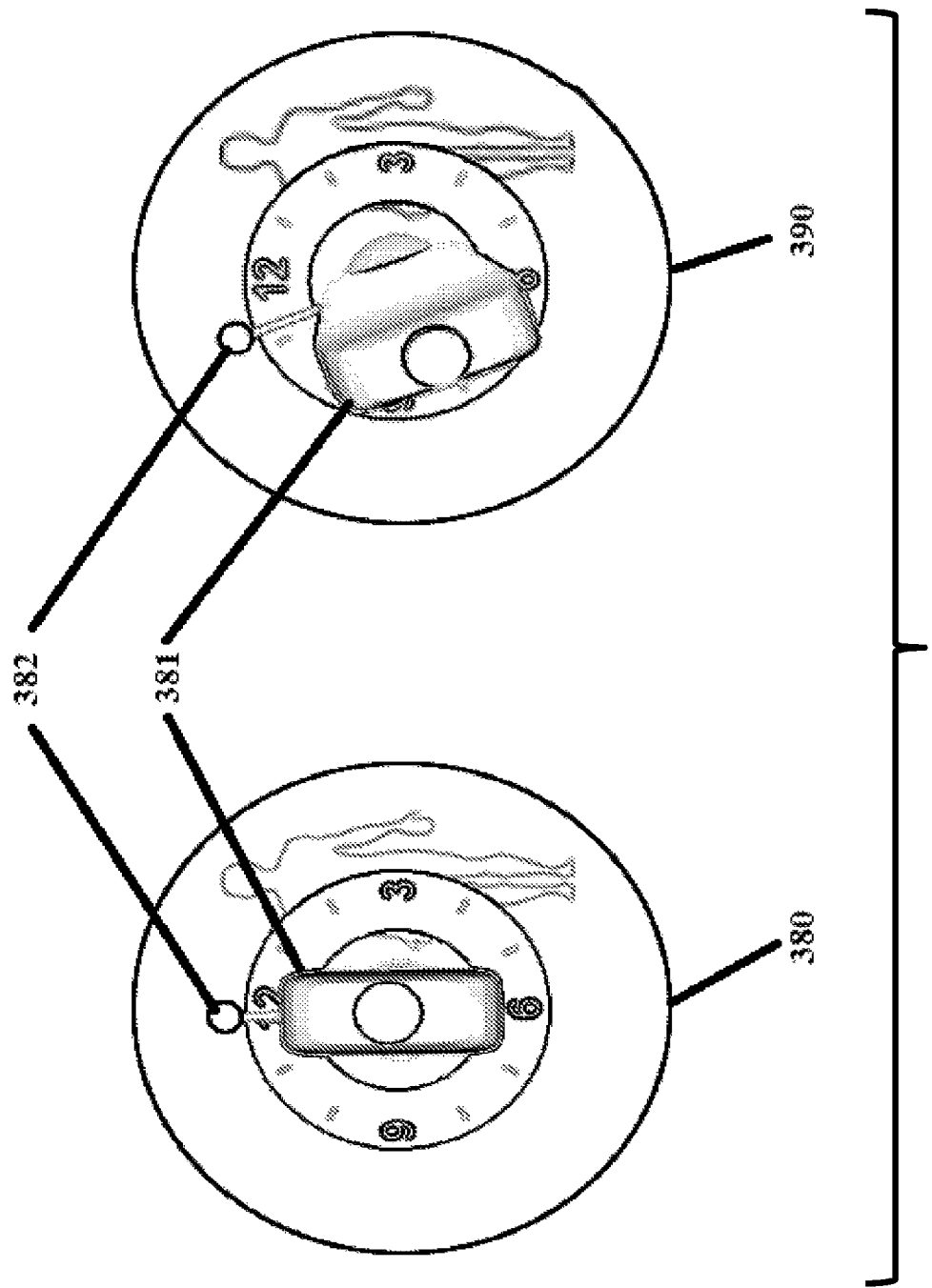
FIG. 3F shows an example of a clock-face indicator present in some embodiments.

FIG. 3F shows an example of a clock-face indicator present in some embodiments. The clock-face indicator (e.g., 380, 390) shows the rotation of an imaging/ultrasound probe (381) in relation to an imaginary clock face. In indicator view 380, the center dot of the probe is perpendicular to the skin, and in indicator view 390, the probe is not perpendicular. A tactile notch, ridge, bump, or indicator of the probe demarks the hour hand of the clock face (382). During a training exercise, for example, the user can be prompted to hold the ultrasound probe at a specified rotation, and the clock-face indicator can reveal to what extent the user complied. In clock-face indicator view 380, the probe is shown in the 12-o'clock position, and in view 390, the probe is shown in the 11-o'clock position.

Figure 4C:
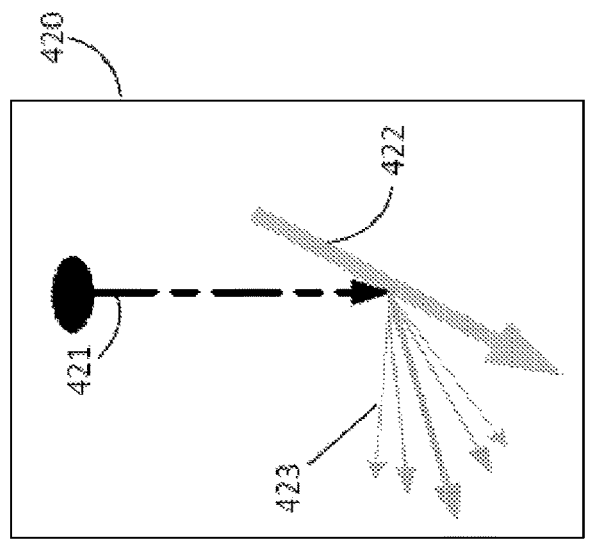
FIGS. 4A-4D show example implementations of an anisotropy indicator and perspectives thereof.
Figure 4B:
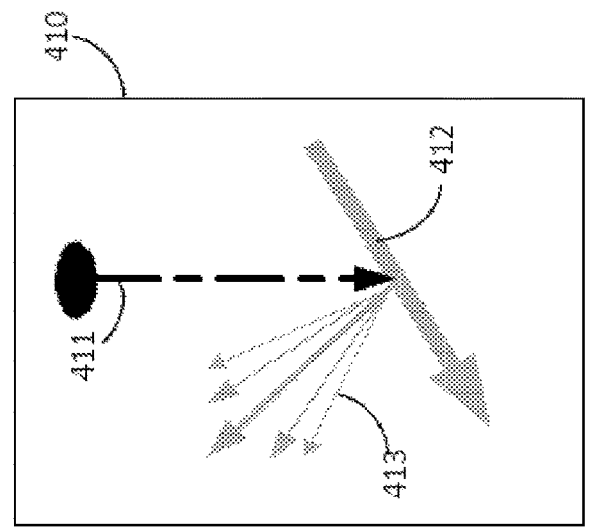
Figure 4A:
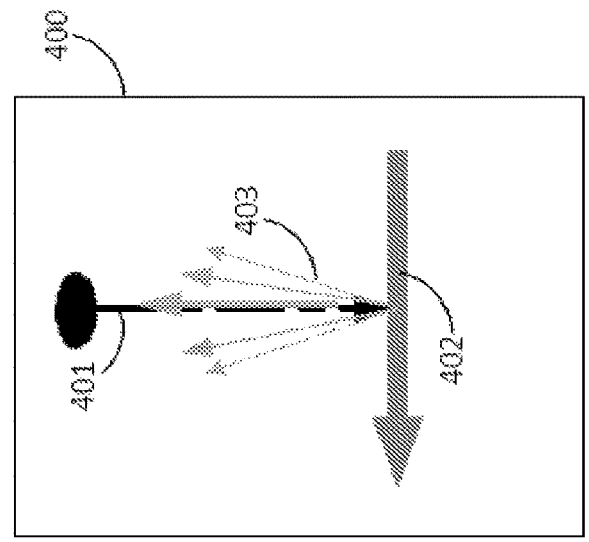

FIGS. 4A-4C show example implementations of an anisotropy indicator. The indicator interfaces in FIGS. 4A-4C render a virtual viewpoint depicting a virtual orthographic camera that remains perpendicular to a plane defined by two lines: (a) the midline or other characteristic line of an instrument and (b) a ray (that is part of the insonating plane) that strikes the midline of the instrument. The discussion of FIGS. 4A-4C primarily center on a needle as the tracked instrument, but it should be understood that techniques can apply to the surface of any tracked instrument or any human or animal tissue or tissue interface or fascia used in conjunction with an ultrasound probe.

The anisotropy indicator shows a view of the orientation of the tracked instrument in reference to the orientation of the ultrasound probe and the insonating plane. The position and the rotation in space of both the needle and the ultrasound probe are tracked by a tracking system as described in FIG. 1A. Thus, the tracking system can determine if the needle is in the insonating plane of the ultrasound probe and can calculate the incident angles between them.

In FIGS. 4A-4C, example interface elements are shown that act as cognitive aids for the user. Lines to indicate the incident and reflected beams and the tracked surface or instrument are shown in the examples.

In FIG. 4A, anisotropy indicator 400 shows an example of a needle that is being held at a right angle to the ultrasound probe axis, providing perfect visibility of the needle. Here, a user could clearly see the needle in the ultrasound display image (as in FIG. 2). It should also be noted that this indicator is applicable to either the in-plane or out-of-plane ultrasound guided needling technique. For example, if the user is in-plane, the needle would show on the ultrasound display as a white horizontal line, and if the user is out-of-plane, the needle would be depicted as a white dot.

In the figure, the probe emits an incident beam, depicted by the incident beam line 401. The contacted surface is, in this figure, a needle, represented by the needle line 402. The incident beam line 401 intersects the needle line 402 at a right angle, representing the needle's perfect orientation to the ultrasound probe. The reflected beams are represented by the arrowed reflection line grouping 403 emerging from the needle line 402. The central line in the reflection line grouping 403 represents the majority of the reflected beams, while the additional arrows to the left and right of the central line represent scattered reflection beams. In FIG. 4A, the normal line from the surface of the needle is equivalent to the incident line 401, therefore the central reflection line is superimposed on the incidence line 401.

FIG. 4B shows an example of an anisotropy indicator 410 when a needle is being held not at a right angle to the ultrasound probe, but is being held at an angle where at least some of the reflected beams remain detectable to the ultrasound probe. In this situation, the needle image may be detectable in the ultrasound display in FIG. 2, but perhaps not with the same clarity or sharpness. To show the non-optimal but still detectable position of the needle, the anisotropy indicator 410 in this scenario shows that the incidence line 411 is contacting the needle/surface line 412, resulting in reflection lines 413 that are not coincident with the lines of incidence.

FIG. 4C shows an example of an anisotropy indicator 420 when a needle is being held at a severe angle (e.g., more than 45 degrees) with respect to the ultrasound probe axis. Almost none of the reflected insonating beams are reflected back to the ultrasound probe, and therefore the user would be unable to see the needle on the associated simulated ultrasound display in FIG. 2. To show the needle is undetectable, the anisotropy indicator 420 in this scenario shows the incident line 421 contacting the needle/surface line 422 at the severe angle. The indicator displays reflection lines 423 which would be reflected undetectably away from the ultrasound probe.

In certain implementations, the depth of color of the detected object line (e.g., the needle line) may vary with reference to the detectability of the object. For example, the indicator may show a brighter colored or different colored line depicting the tracked instrument or surface when the ultrasound probe's insonating plane and the surface are closer to an optimal perpendicular angle. Similarly, when the tracked instrument or surface is undetectable, the detected object line may show another colored line or dimmer line. In addition, if a needle with a hyperechoic tip is being simulated, the needle depicted in the simulated US image may have a brighter intensity at the tip.

In certain implementations, the reflection lines can be color-coded to depict the probe's ability to receive the reflected beams. For example, the reflection lines may be color-coded bright red or green when the probe is capable of receiving the reflected beams, and the reflections lines may be dull grey when the probe is not capable of receiving the reflection beams. In some implementations, the incident and reflection beams may be rendered as an animation with discs, arcs, or segments of concentric ripples representing sonic energy instead of arrows. In some implementations, the incident and reflected beams may not be rendered on the anisotropy indicator when the needle or other surface being imaged is not within the insonating plane.

In some medical ultrasound procedures, a marker pen is used on the patient's skin to write anatomical targets, depths, and distances determined with an ultrasound probe. The ultrasound probe is then set aside, and a needle or other instrument is inserted into the target (depicted by the mark previously made with the marker) using both hands. This technique is referred to as "ultrasound-assisted" (in contrast to "ultrasound-guided", in which both the ultrasound probe and the instrument are used simultaneously).

In certain implementations, a tracking device (e.g., a 6 DOF tracker) is clipped to the ultrasound probe. If the probe shape is known, the tracking system knows the spatial location of the insonating plane for that probe. In some instances, the virtual model can determine the different properties (penetration depths, distortions, insonating plane shape) of different physical simulated or actual ultrasound probes by identifying each ultrasound probe via the unique tracking sensor identifier in, or attached to, the probe. A lookup table can match each unique tracking sensor identifier to a given probe model and its insonating characteristics so that the simulated US image exhibits the characteristics such as curvature and penetration associated with different US probe models. Thus, different types of probes (curved array, linear array) can be physically simulated and swapped for use with the simulator, and the US image produced is appropriate for the known characteristics of the given probe that is being used with the simulator.

When the ultrasound probe placement is in the proper location with respect to a target, e.g., when the target is aligned to the center of the ultrasound image, a practitioner selects an option to save the ultrasound probe position and orientation. The selection option could be a button on the probe or probe tracker mount, a footswitch, or a keyboard button, for example. Alternatively, when the location is saved, a virtual ghost needle is placed with its axis perfectly aligned with the US probe's axis at the saved position. The position and orientation between the US probe and needle is critical to success. With our mixed reality approach, the exercise can be as straightforward as copying the previous probe position and orientation with the needle. The sequence is: (a) obtain an ideal insonation plane where the target is on the midline of the insonation plane; if the target is on the midline, mark the target (using up down arrow keys that move a reticle up and down the midline respectively or touch the target on a touch sensitive screen), then a 3D virtual needle of the type and model that will be used is placed virtually at the exact desired position and orientation. Then, a tracked needle can be used without US guidance and the virtual counterpart of the tracked needle is moved until it is coincident with the previously "placed" needle. Note that this approach will aid any orientation, not just perpendicular to the skin.

A display interface can be rendered to show the tracked ultrasound probe position and orientation relative to a saved one. For example, a ghost probe can be rendered to show saved vs. current probe position and orientation. When the practitioner is ready to transition to needling, a tracking device is clipped to the needle or syringe body. The needle and syringe shape is known, and the tracking system knows where the needle and needle tip are in space by virtue of output from the tracking device. The display interface shows needle position and orientation relative to the saved ultrasound probe position and orientation, so that the needle axis can be matched perfectly to where the probe axis was when the practitioner saved the position/orientation. When a tracked needle is used without ultrasound guidance, the virtual counterpart of the tracked needle is moved until it is coincident with the previously "placed" needle.

If patient movement is a concern in an actual patient care situation, patient tracking can be accommodated with a separate sensor attached to the patient's skin as close as possible to the needling site with an adhesive pad. The virtual model may then compute offsets from the relative difference between the moving patient and the tracked instruments.

The approach described will aid any orientation of ultrasound or tracked instruments, not just those perpendicular to the skin. However, the ultrasound-assisted technique requires the user to maintain an identical position and orientation to the probe when the needle later follows the path of the probe. Since perpendicularity is optimal for ultrasound imaging (e.g., perpendicular to the skin over the anatomical target), a perpendicularity indicator may be beneficial during an ultrasound-assisted technique.

Figure 4D:
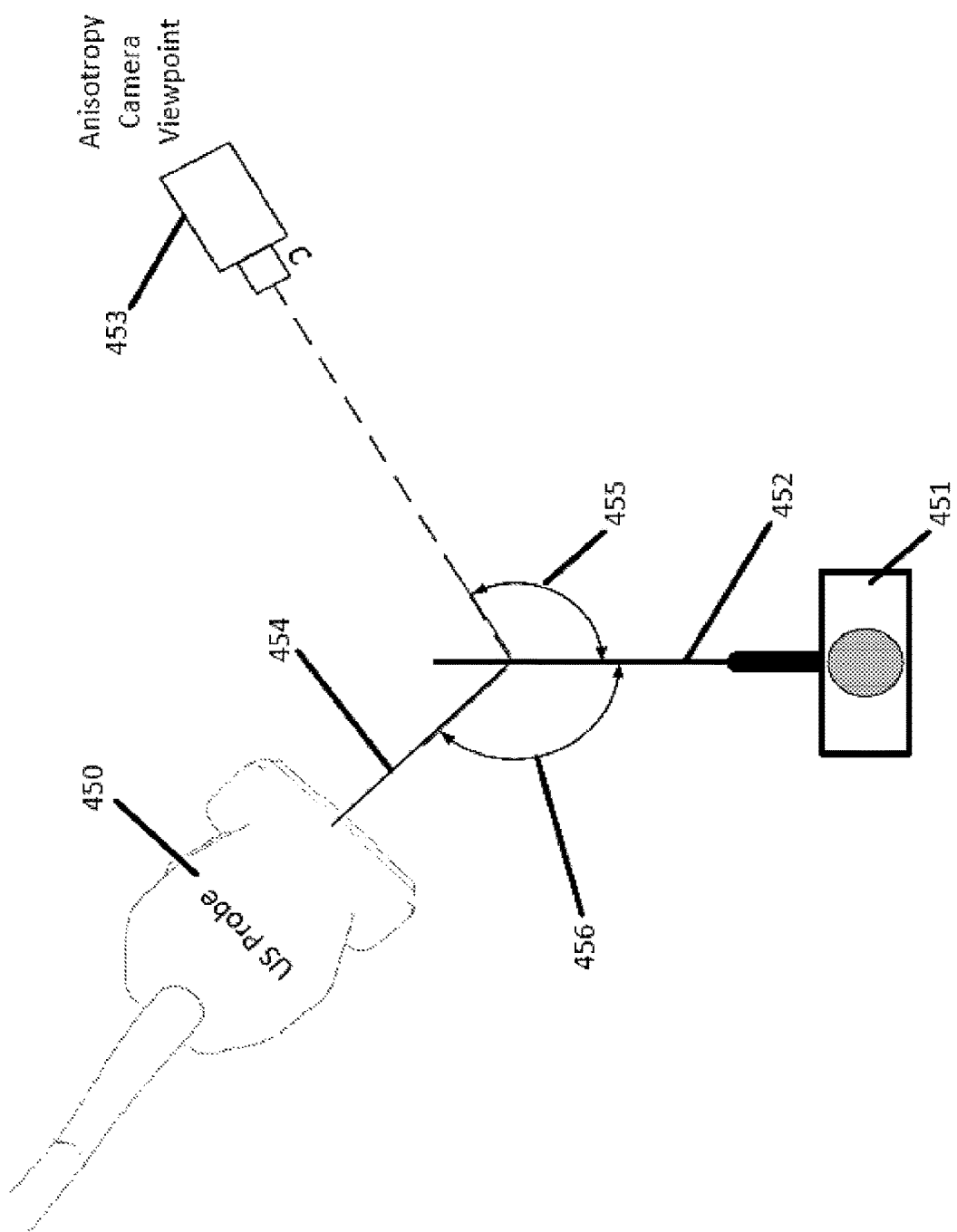

FIG. 4D shows a representation of certain aspects of an anisotropy indicator which may be illustrative. FIG. 4D shows the perspective of the orthographic anisotropy camera in reference to the viewpoint of the indicator. In FIG. 4D, ultrasound probe 450 and tracked instrument 451 (e.g., needle with midline 452) are shown for clarity of reference. The orthographic anisotropy camera 453 view is shown in reference to probe 450 and tracked instrument 451. Insonating ray 454 from the probe 450 is also shown. An angle 456 is formed by the midline of the instrument 452 and the insonating ray 454. The viewpoint of the anisotropy camera 453 is maintained at a right angle 455 to the plane formed by the midline of the instrument 452 and the insonating ray.

FIGS. 5A-5B show examples of an implementation of a perpendicularity indicator. The interfaces in FIGS. 5A-5B render a virtual camera viewing, from above, a virtual model of a surface (e.g., the skin of a patient). The viewpoint of the virtual camera remains perpendicular to the surface being viewed or insonated at all times, even on a curved surface such as a head or the dorsal surface of the upper torso.

FIG. 5A shows an example of a perpendicularity indicator 500 for a tracked needle. In FIG. 5A, a targeting ring of concentric circles 501 shows the central point of the perpendicular line from the particular point on the surface being probed. A virtual representation of the ultrasound probe 502 shows the position and orientation of the probe with respect to the curved surface. A targeting cue, such as a dot or circle, may represent the center 503 of the probe 502 to assist in targeting the probe. In FIG. 5A, the probe is in perfect perpendicular alignment to the surface being insonated, as shown in the perpendicularity indicator by the center dot 503 of the probe 502 being placed in the center of the targeting ring 501.

FIG. 5B shows an example of a perpendicularity indicator 510 for a tracked needle. In FIG. 5B, a targeting ring of concentric circles 511 identifies the central point of the perpendicular line from the surface. A virtual representation of the needle 512 shows the position and orientation of the needle with respect to the curved surface. A dot or circle may represent the center 513 of the tracked needle 512 to assist in targeting the needle 514. In FIG. 5B, the needle is not in perpendicular alignment to the surface being insonated, as shown in the perpendicularity indicator by the center dot 513 of the probe 512 being depicted as outside the targeting ring 511. If the user inserts the needle in this position and orientation, the user will likely miss the target even though the needle enters the skin at the spot previously marked by using the ultrasound probe.

The discussion of FIGS. 5A-5B primarily center on a needle as the tracked instrument, but it should be understood that techniques can apply to any tracked instrument used in conjunction with an ultrasound probe or other imaging probe.

It should be noted that multiple indicators and/or cognitive aids may be rendered in a given virtual environment or visualization. For example, any combination, or all of, an anisotropy indicator, in-plane and out-of-plane indicator, US probe position indicator and a perpendicularity indicator may be shown simultaneously as views, view windows, thumbnails, or other interface elements in a particular usage case. The combination of indicators may be user-selectable and the selection state may be dynamically modifiable.

In some scenarios, for example where a procedure is simulated, a score including an efficiency rating may be calculated and displayed to indicate the user's proficiency at the technique. Overall, because all user interactions are being tracked, the simulator can automatically provide an objective score at the end of a simulated procedure based on a scoring algorithm, and provide an automated breakdown of the score indicating where points were lost and where points were gained. One element of the scoring algorithm is the amount of time the needle tip was not in the insonation plane or was invisible (because of anisotropy) while the needle was being advanced. This is the equivalent of "flying blind" and might be penalized by the scoring algorithm. The distance when the tip was being advanced while not visible (because it was out of insonation plane or anisotropy) can be graphically depicted as colored (e.g., red) portions of a graphical 3D needle trajectory while the instances where the needle tip was truly visible in the US image are color-coded a different color (e.g., green). The ratio of color segments (e.g., red to green) can be calculated and used as a factor in the scoring algorithm. The graphical 3D needle trajectory can also be rendered in centimeter and millimeter increments to aid in distance measurement. In addition, the visualization can be temporarily frozen in place and/or stored for replay during debriefing or after action review. During the freeze or replay, the virtual camera controller can be manually moved to change the perspective of the virtual camera to see better, more instructive perspectives for the learner.

In some implementations, a combined physical and virtual system can include objects or learning aids in the physical and/or virtual model that can be used for simulation. Physical objects (e.g., simulated anatomical structures) can use a tracker that is part of a magnetic tracking system to assist the combined physical and virtual system in determining the location and orientation of instruments. The tracker can be one of the most costly items present in a combined physical and virtual system. Therefore a modular approach to the mounting of different physical objects such as modular simulated anatomical structures on a single mount/stand containing the tracker (e.g., MRT or SRT) can be advantageous. Some examples of medical procedures that may benefit from a modular design include Some examples of medical procedures that may benefit from a modular design include ventriculostomy (also known as external ventricular drain or EVD), central venous access (CVA), transrectal ultrasound (TRUS) guided manual biopsy of the prostate, thyroid biopsy, hip effusion biopsy, other types of blind, guided or assisted biopsies, cross-sectional literacy and ultrasonography skills trainers, intravenous line access, chest tube placement, pediatric caudal block and regional anesthesia (RA) as well as veterinary procedures for all animals (mammals, fish, reptiles, amphibians. etc.).

Figure 7A:
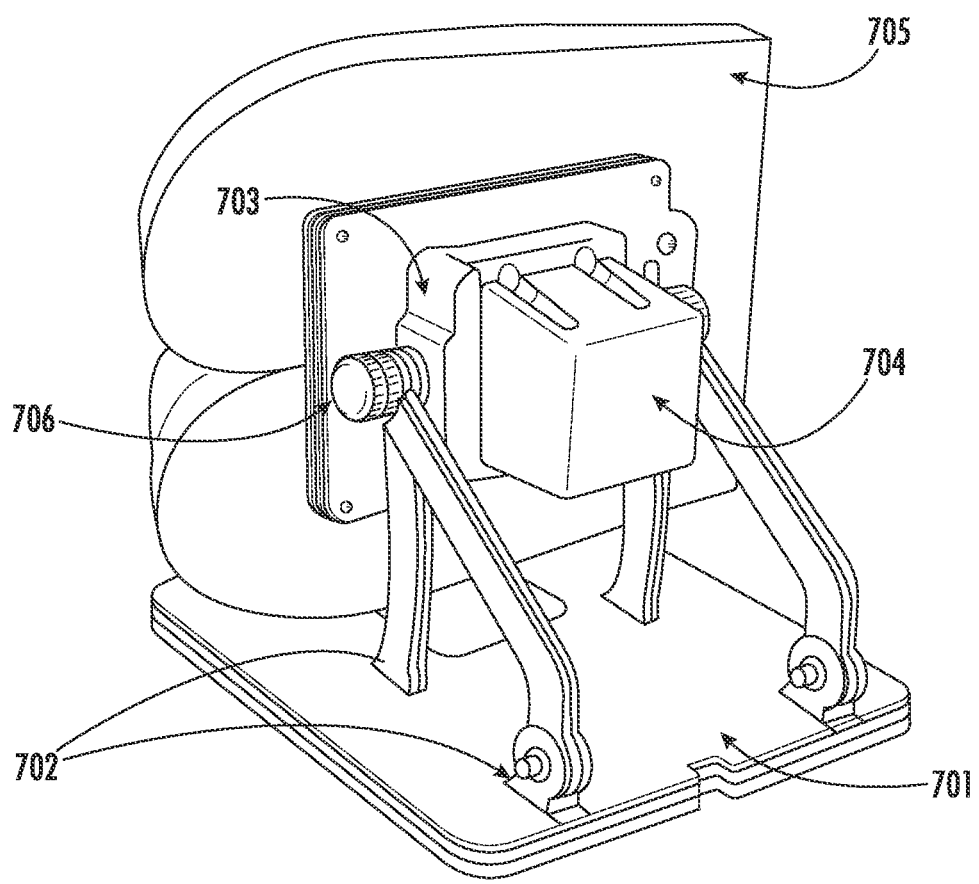
FIGS. 7A-7J show a modular stand system with different examples of anatomical learning modules.
Figure 7B:
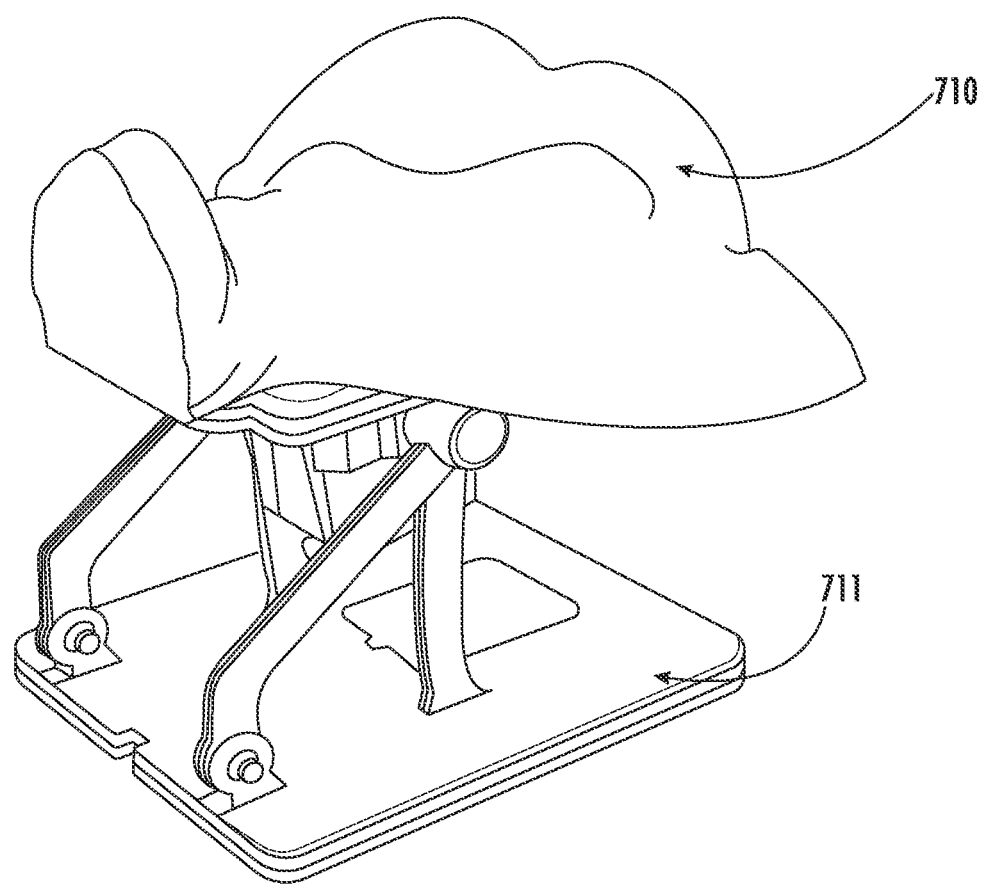
Figure 7C:
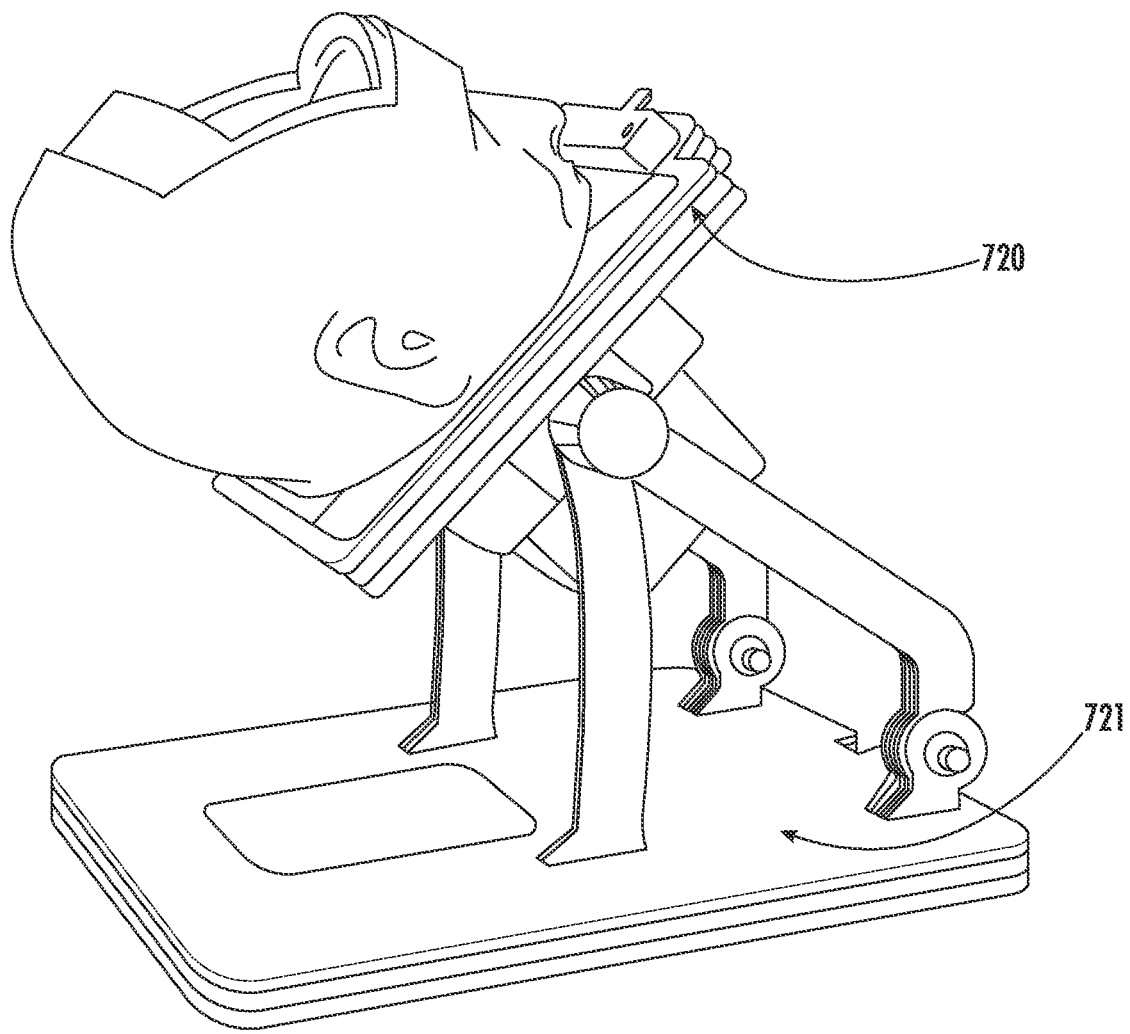
Figure 7D:
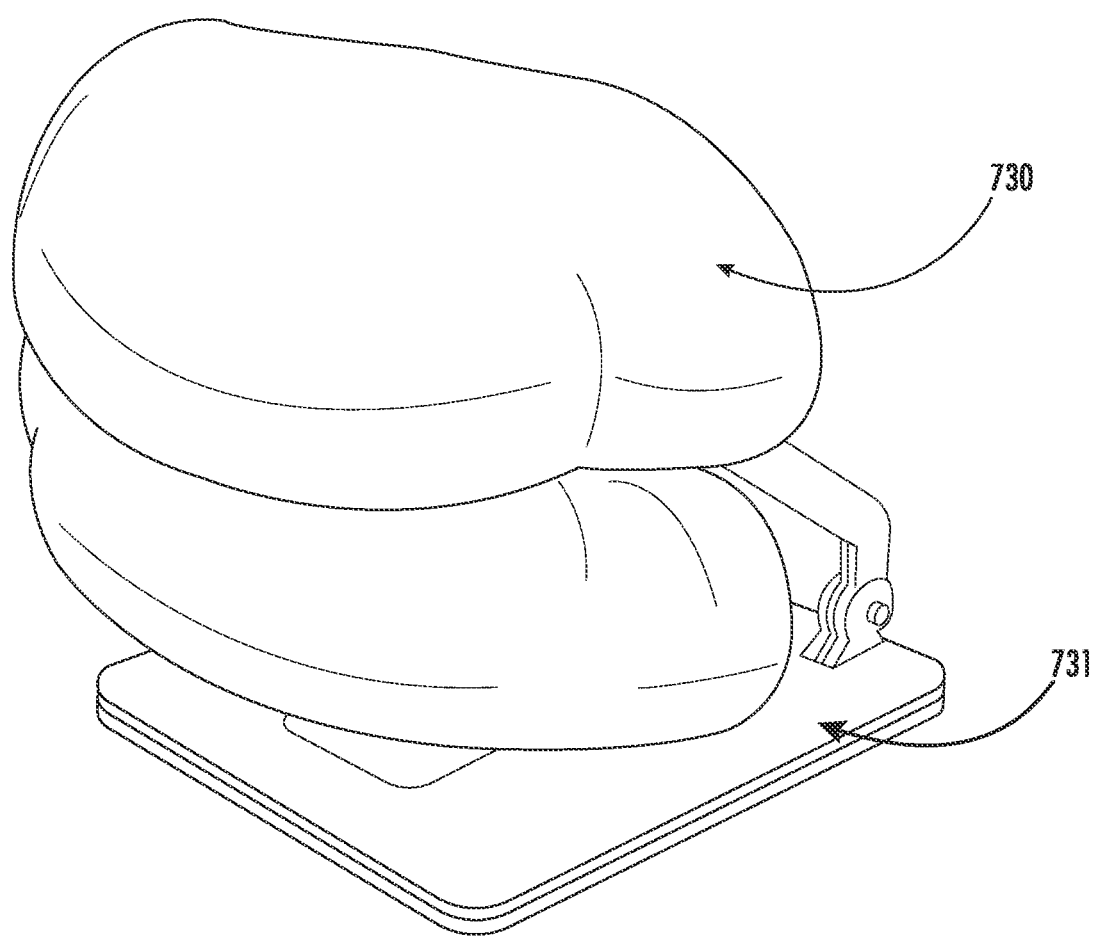
Figure 7E:
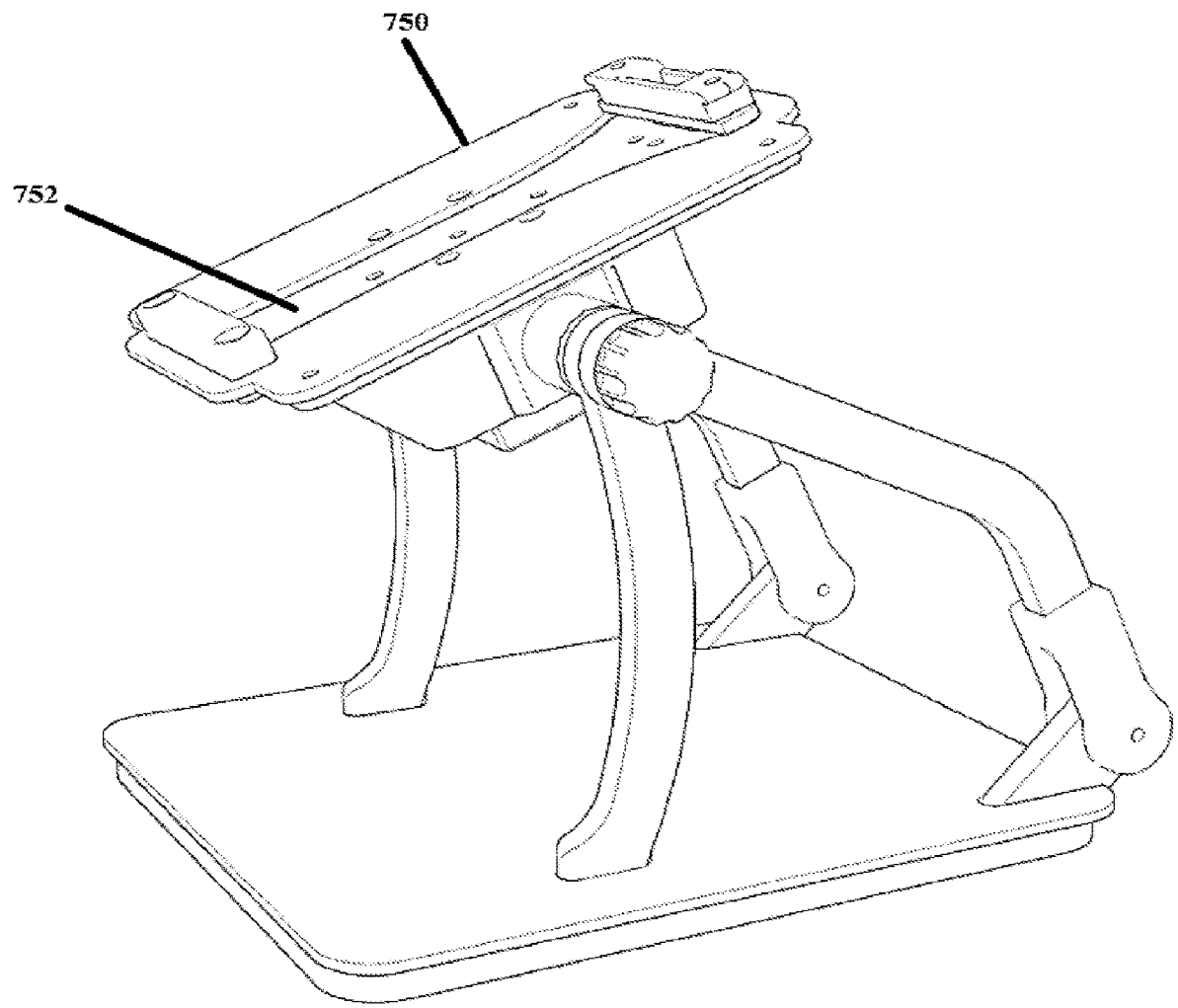
Figure 7F:
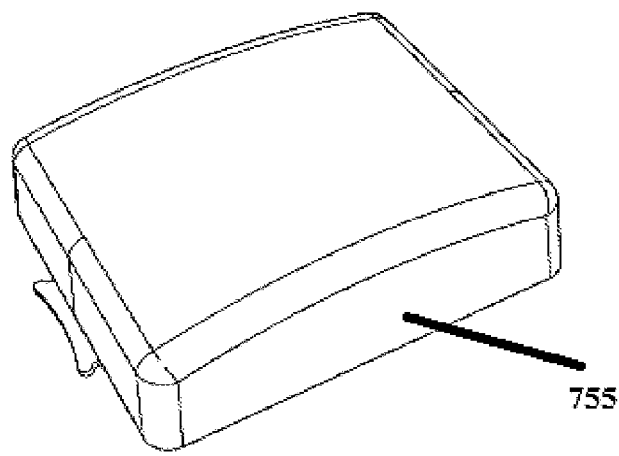
Figure 7G:
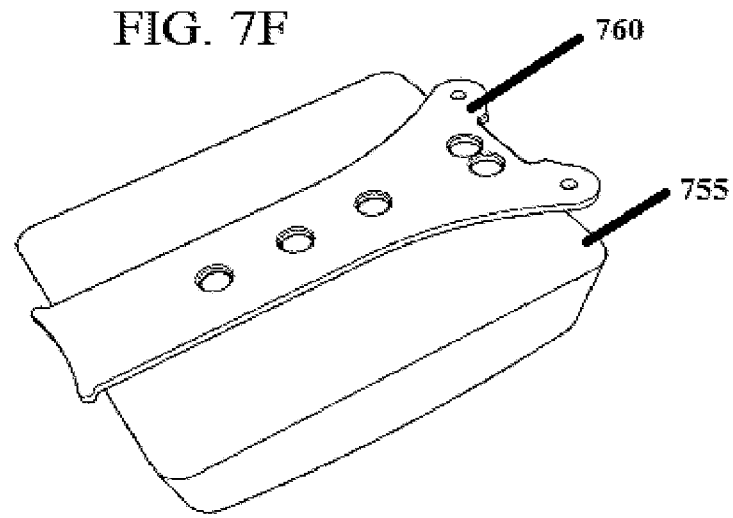
Figure 7H:
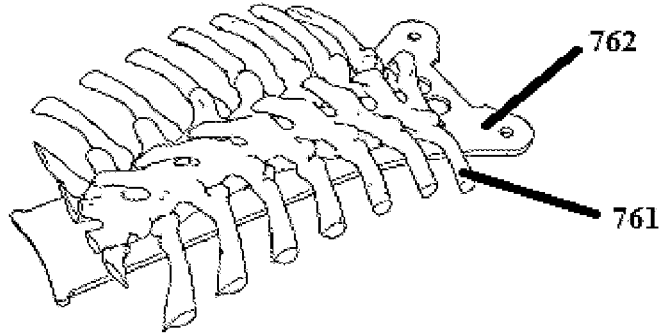
Figure 7I:
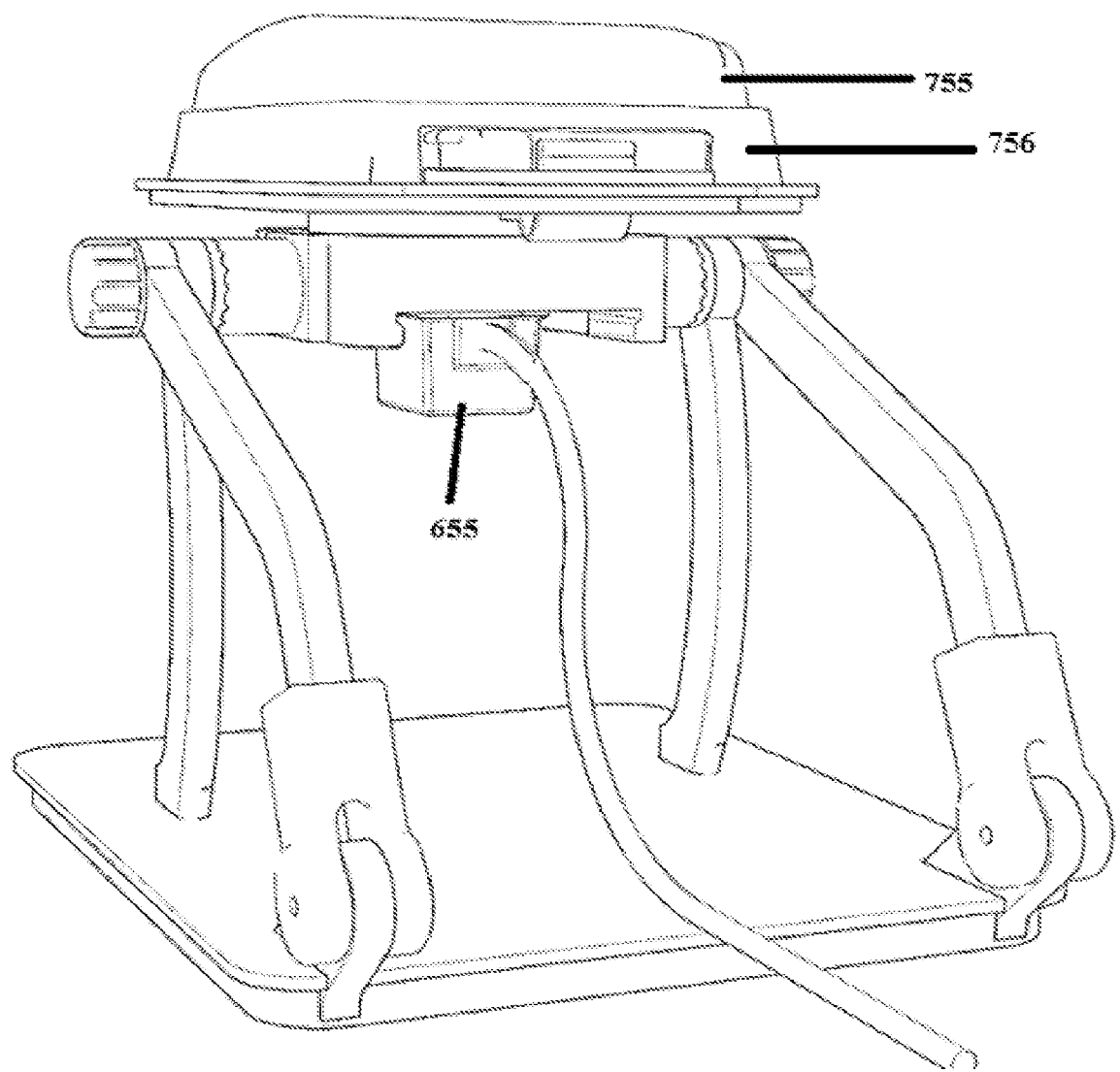

FIGS. 7A-7J show examples of a modular stand system implementing a modular approach. FIG. 7A shows aspects of the modular stand with a learning module mounted. The modular stand shown has a base for stability 701; legs 702 to prop an attached MRT/SRT or other tracker away from the table surface and any ferromagnetism from the metal found in tables and folding tables; a universal mount 703 that accepts different swappable learning modules, such as anatomical regions, that are relevant for the different procedures to be simulated; and an MRT/SRT or other tracker 704 mounted on the underside or other aspect of the modular stand's universal mount. A learning module 705 is shown attached to the modular stand mount. The modular stand can be rotated along two planes: a sagittal plane so that, for example in the case of a thoracic RA the patient can be simulated to be sitting erect, bent over, or prone, as well as in multiple positions in between; and a coronal plane so that the patient can be simulated to be on the side (e.g., decubitus). Rotation control 706 may be provided for assisting in the rotation of the device along the planes. In one implementation, the tracker is fixed while the mount can rotate independently in the coronal plane; the learning module is tracked with its own sensor. In another implementation (shown, for example in FIGS. 7I and 7J) the tracker rotates with the mount and the learning module; in this case, the tracker is rigidly coupled to the learning module and a separate sensor for the learning module is not needed. The rotation of the modular anatomical block in the sagittal and coronal planes can be inferred from the location of the tracked instruments when they are placed in their holding tray relative to the tracker that rotates together with the modular anatomical block. In another implementation, the tracker is fixed while the mount can rotate independently in the coronal plane.

FIGS. 7B-7D show different examples of learning modules or learning blocks (such as relevant parts of human anatomies) that may be interchangeably mounted onto the modular stand. FIG. 7B shows a neck and clavicle learning module 710 (e.g., for a CVA procedure) mounted on the modular stand system 711. FIG. 7C shows the top half of a skull 720 mounted on the modular stand system 721. FIG. 7D shows a learning module of buttocks including rectum 730 (e.g., for a prostate biopsy guided by Trans-Rectal UltraSound, or TRUS) mounted on the modular stand system 731. The prostate biopsy simulator includes a physical prostate that is not fixed in space but instead is able to move (within a bounded region) in response to pressure applied, for example, from a TRUS probe inserted via the rectum.

As noted, a learning module may have internal components inside, for example embedded in gel, that have virtual representations in the virtual model. Many other types of learning module (not shown) may also be represented, for example the upper torso, dorsal aspect (e.g., for a Thoracic RA procedure); and the lower back, dorsal aspect (e.g., for an epidural procedure). In addition, a procedure may have different learning modules containing anatomic variability of varying complexity. In this way a learner may train for a procedure on different simulated patients, beginning with an easy case and then progressing to a more difficult case. Some of the simulated patient variability can be modeled virtually without swapping the physical learning module, for example, by moving a virtual lung surface closer or farther from a ligament. Other simulated patient variability, for example a difficult spine with small spaces that are difficult to access, may require swapping the physical learning module. Other anatomic details (e.g., muscles) can be removed physically or virtually for beginners.

FIG. 7E shows an example of the stand system depicting the universal mount 750 with no learning module attached. An indexing notch or space 752 is shown wherein a learning module indexing plate common to all learning modules inserts/nests into the universal stand 750.

FIG. 7F shows an example of a learning module made of gel 755 or similar penetrable material. FIG. 7G shows the underside of the gel learning module 755, displaying its indexing plate 760. FIG. 7H shows an example of a thoracic spine anatomy 761 rigidly affixed to an indexing plate 762. A thoracic spine anatomy 761 would generally be surrounded by a gel-like material to simulate human tissue; however, in FIG. 7H the gel is not shown for clarity. The indexing plate can be rigidly attached to a separate tracking sensor, or be rigidly attached to the MRT/SRT tracker as described in FIGS. 7I-7J.

An advantage of the modular stand/mount design is that it spreads the high cost of the tracker or other similar device over multiple applications rather than requiring the purchase of a separate, expensive, heavy tracker for each application. The modular design is perfect for a simulation or training facility that does not teach all procedures simultaneously but instead teaches them in sequence. The precision modular mount allows the different anatomy/learning blocks to be swapped in and out very quickly (about one minute) without the need to perform a time-consuming calibration when a new anatomy/learning block is swapped in. Expense, weight and space (volume) are saved by the modular stand/mount design.

FIG. 7I shows a rendering of the modular stand system with a learning module attached 755. Tracking system transmitter unit 655 is shown mounted/affixed to the stand. To facilitate holding the skin onto the modular anatomical block 755 so that it can be quickly removed as needed to directly see below the skin, a skin frame 756 that runs around the perimeter of the anatomical block 755 is used to press the skin tightly onto the modular anatomical block. To remove the skin, the skin frame 756 is first removed, allowing the simulated skin to be peeled off the modular anatomical block 755. In some cases, different thicknesses or types of simulated skin can be exchanged, for example to better simulate the skin anatomy of animals or bariatric patients.

Figure 7J:
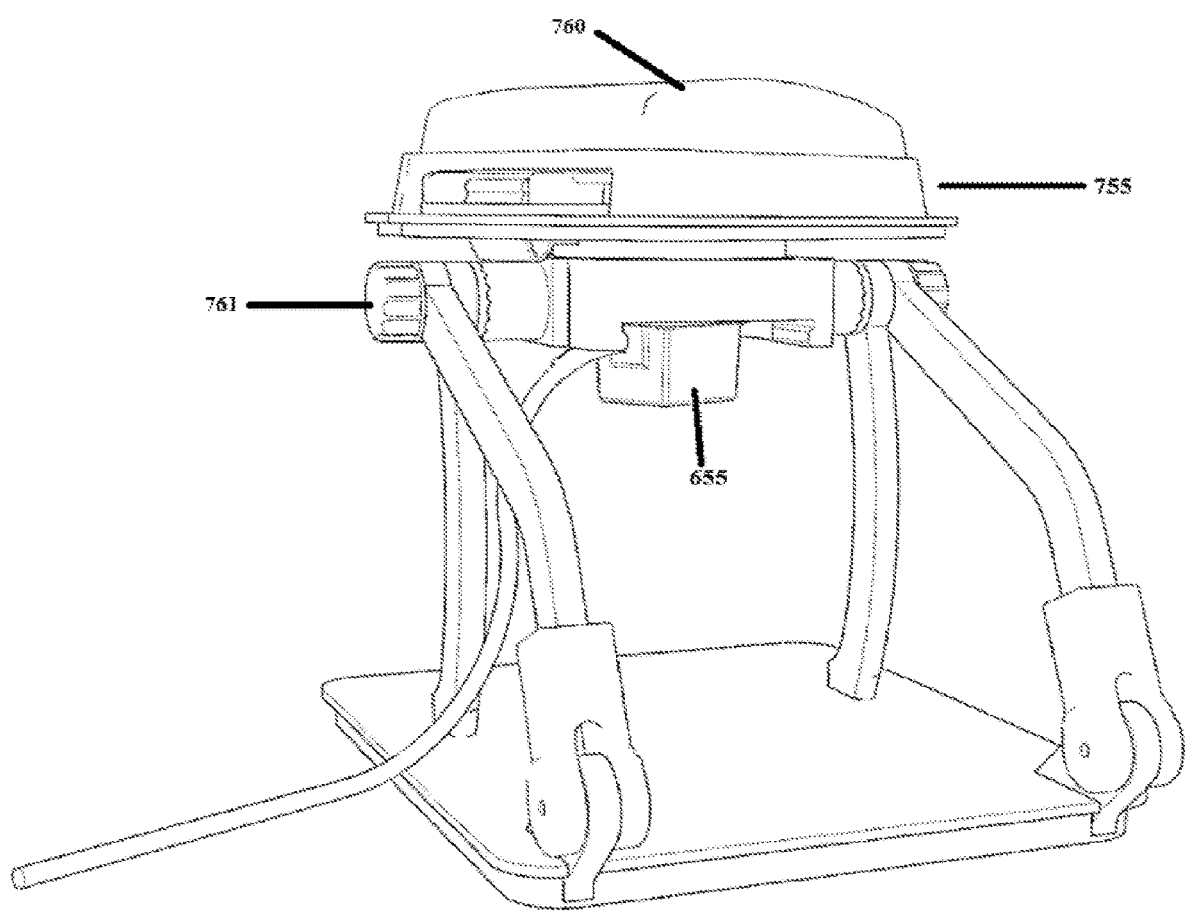

FIG. 7J shows the modular stand system with learning module block rotated upon its axis to a different location. The modular stand can be rotated along two planes: a sagittal plane so that, for example, in the case of a thoracic RA the patient can be simulated to be sitting erect, bent over, or prone, as well as in multiple positions in between; and a coronal plane so that the patient can be simulated to be on the side (e.g., decubitus). A rotation control knob 761 allows rotation in the sagittal plane, and rotation of the anatomical block 760 around the axis perpendicular to the anatomical block allows rotation in the coronal plane.

Figure 6A:
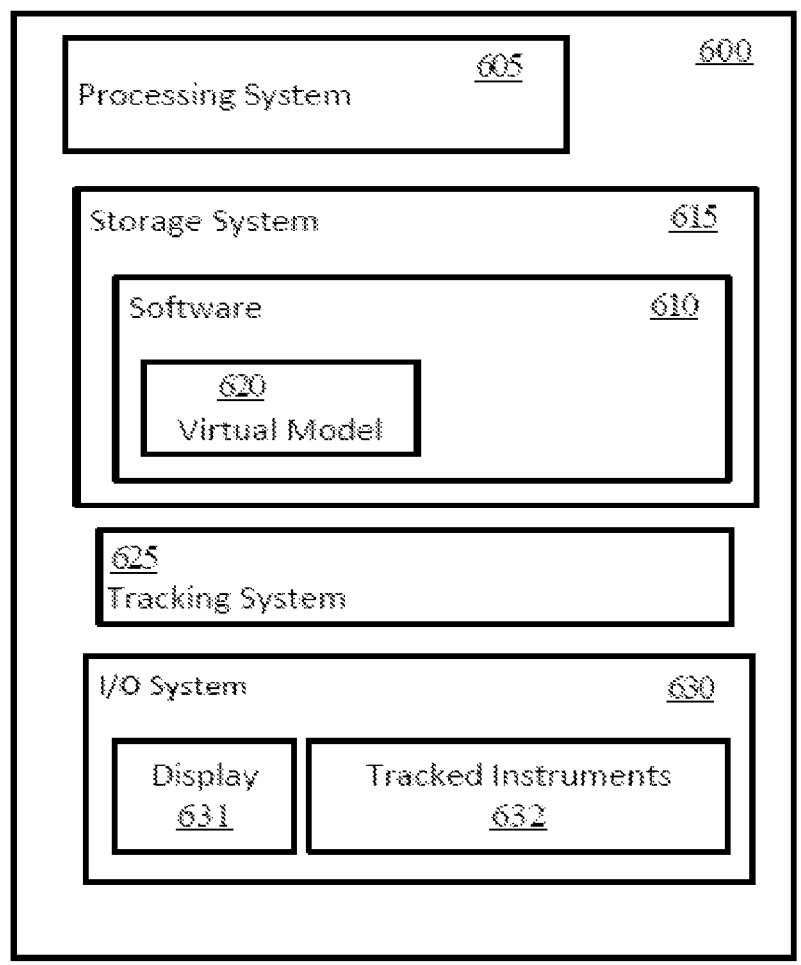
FIG. 6A shows a block diagram illustrating components of modular, inter-operable devices and modular systems that may be used to implement the techniques described herein.

FIG. 6A shows a block diagram illustrating components of devices and systems that may be used to implement the techniques described herein.

Referring to FIG. 6A, system 600 may represent a computing device such as, but not limited to, a smart phone, a personal computer, a tablet computer, a laptop computer (notebook or netbook), a desktop computer, or a server computer. Accordingly, more or fewer elements described with respect to system 600 may be incorporated to implement a particular computing device.

System 600, for example, includes a processing system 605 of one or more processors to transform or manipulate data according to the instructions of software 610 stored on a storage system 615. Examples of processors of the processing system 605 include general purpose central processing units, application specific processors, graphics processing units, and logic devices, as well as any other type of processing device, combinations, or variations thereof.

The software 610 can include an operating system and application programs or components such as a virtual model 620 (e.g., 102 of FIG. 1A). Device operating systems generally control and coordinate the functions of the various components in the computing device, providing an easier way for applications to connect with lower level components like input devices or capabilities. Non-limiting examples of operating systems include Windows® from Microsoft Corp., Apple® iOS™ from Apple, Inc., Android® OS from Google, Inc., and the Ubuntu variety of the Linux OS from Canonical. In some implementations, software can include plug-ins or application programming interfaces (APIs) that form a SMARTS software development kit (SDK).

It should be noted that the operating system may be implemented both natively on the computing device and on software virtualization layers running atop the native device operating system (OS). Virtualized OS layers, while not depicted in FIG. 6A, can be thought of as additional, nested groupings within the operating system space, each containing an OS, application programs, and APIs.

Storage system 615 may comprise any computer readable storage media readable by the processing system 605 and capable of storing software 610, including the virtual model 620.

Storage system 615 may include volatile and nonvolatile, programmable and non-programmable, erasable and non-erasable, removable and non-removable media implemented in any method or technology for storage of information, such as computer readable instructions, data structures, program modules, or other data.

Examples of storage media include random access memory (RAM), read only memory (ROM, EPROM, EEPROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal or carrier wave. In addition to storage media, in some implementations, storage system 615 may also include communication media over which software may be communicated internally or externally.

Storage system 615 may be implemented as a single storage device but may also be implemented across multiple storage devices or sub-systems co-located or distributed relative to each other. Storage system 615 may include additional elements, such as a controller, capable of communicating with processor 605.

Software 610 may be implemented in program instructions and among other functions may, when executed by system 600 in general or processing system 605 in particular, direct system 600 or the one or more processors of processing system 605 to operate as described herein for implementing indicators in virtual model.

In general, software may, when loaded into processing system 605 and executed, transform computing system 600 overall from a general-purpose computing system into a special-purpose computing system customized to receive, determine, and display orientation indicators as described herein. Indeed, encoding software on storage system 615 may transform the physical structure of storage system 615. The specific transformation of the physical structure may depend on various factors in different implementations of this description. Examples of such factors may include, but are not limited to, the technology used to implement the storage media of storage system 615 and whether the computer-storage media are characterized as primary or secondary storage.

Tracking system 625, described in more detail in element 104 of FIG. 1A, may contain components that exist in the software layer 610 and in the I/O system 630. The system can further include input/output (I/O) system 630, which may include input devices and components that enable different types of devices, e.g. ultrasound or other imaging probes, tracked instruments or instrument tracking devices 632, and displays 631, to send to and receive input from the system 600.

In certain cases, the input and output devices may be combined in a single device, such as a touchscreen display which both depicts images and receives touch (including multi-touch) gesture input from the user. Visual output may be depicted on the display in myriad ways, presenting graphical user interface elements, text, images, video, notifications, virtual buttons, virtual keyboards, or any other type of information capable of being depicted in visual form.

I/O system 630 components may also include user interface software and associated software (e.g., for graphics chips and input devices) executed by the OS in support of the various user input and output devices. The associated software assists the OS in communicating user interface hardware events to application programs using defined mechanisms. The I/O system 630 including user interface software may support a graphical user interface, a natural user interface, or any other type of user interface.

A communication interface (not shown) may be included, providing communication connections and devices that allow for communication between system 600 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of system 600 may be included in a system-on-a-chip (SoC) device. These elements may include, but are not limited to, the processing system 605 and elements of the storage system 615.

Computing system 600 is generally intended to represent a computing system with which software is deployed and executed in order to implement a combined physical and virtual reality system in conjunction with orientation indicators as disclosed herein.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Figure 6B:
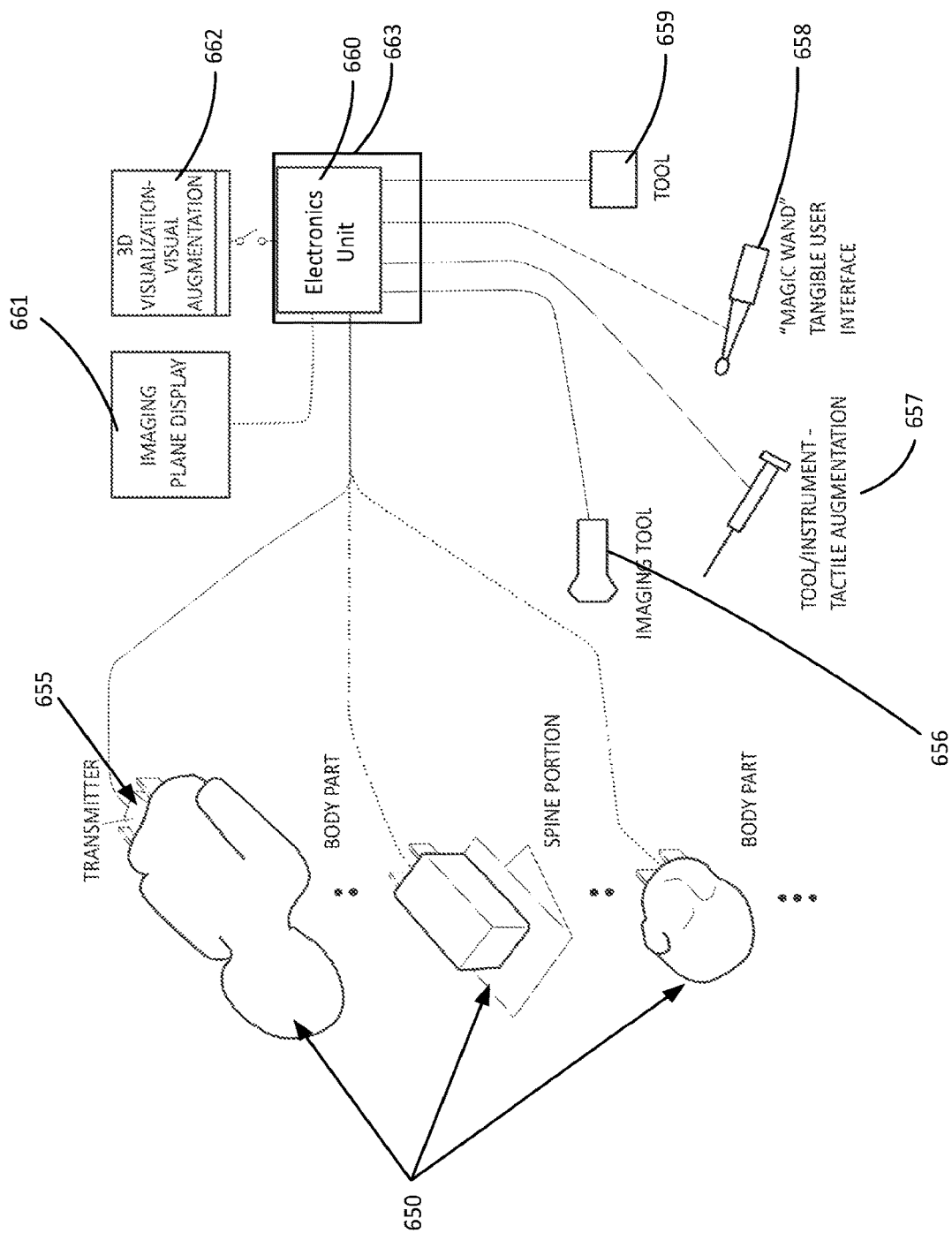
FIG. 6B shows an example system environment in which certain aspects of techniques and modular, inter-operable systems and components may be implemented.

FIG. 6B shows an example system environment in which certain aspects of techniques and systems may be implemented. FIG. 6B shows a system environment illustrating a modular design. In FIG. 6B, various learning modules 650, including, for example, a body/torso, spine portion, buttocks, neck, hip, sacrum and head part may be interchangeably connected (separately or together) to components of a combined physical and virtual mixed reality system for interaction by the user. Learning modules are described with respect to FIG. 7A-7D.

Some implementations or embodiments include an open simulator architecture (which may be called SMARTS, or System of Modular Augmented Reality Tracked Simulators, herein). Advantageously, using SMARTS may allow the tracked instruments to be inter-operable between different simulators for the same or different procedures as long as the simulators follow the SMARTS architecture. Inter-operability means that a given tracked instrument such as a needle, imaging probe, or TUI/camera controller can be used in one RA simulator and in a plug and play design be seamlessly used in a different simulator for the same procedure (i.e., RA) or even in a different simulator for a different procedure (e.g., CVA). The SMARTS open simulator architecture provides a rapid simulator development platform that allows extensive reuse of common components. Advantageously, this approach, when combined with a software development kit (SDK) that includes plug-ins and application programmer interfaces (APIs) reduces the development time and effort to implement a simulation for a new procedure and the relevant new (if needed) physical and virtual anatomy associated with it.

Some embodiments of a tracked instrument and tracking system may provide a modular design having several advantages. For instance, when placing the tracking sensors inside the needle bore near the needle tip during manufacturing, it may not be possible or practical to consistently place the 6 DOF (six degrees of freedom) sensor in exactly the same orientation with respect to the bevel of the needle or a reference surface such as the top surface of the universal needle hub. Therefore each needle or tracked tool where the sensor cannot be reproducibly and consistently positioned during manufacture for all required degrees of freedom include offsets that are manually acquired during calibration of the needle to compensate for inconsistent placement of the sensor within the needle. To facilitate inter-operability between different simulators implemented on the SMARTS simulator architecture, for example to decrease downtime by allowing parts such a tracked tool, tracker (e.g., MRT, SRT, other) or tracker processing unit (e.g., TrakStar, DriveBay, etc.) from a damaged simulator to be scavenged to keep another simulator operational, the offsets, calibration constants and parameters unique to each can be stored in memory (e.g., an EPROM or EEPROM) that is self-contained to the sensor of the tracked tool, the tracker or tracker processing unit.

Furthermore, the universal needle hub (discussed with respect to FIGS. 9A-9B) may be used with different needle lengths that are required for different simulation applications. For example, the ventriculostomy simulation requires a much longer needle-like catheter insert installed on the needle hub than the regional anesthesia or central venous access simulators. Parameters written on the tracked tool's memory allow the software application to note which type of needle is attached to the hub and whether it is suitable for that simulation. Other tracked tools, such as the ultrasound probe, can contain other types of sensors (e.g., pressure sensors) that require calibration offsets to be read by the software.

In some cases, the tracking system may contain user interfaces accessible to a simulation developer that allow the tracking parameters to be adjusted and fine-tuned for a particular simulation application. Such a user interface also allows a simulation developer to read and edit the offsets and parameters stored in the tool's memory. Taken together, the a universal needle hub, self-contained offsets, and unique parameters and the plug-ins are part of the SMARTS API and SMARTS SDK for rapid development of additional simulators for other medical procedures.

Instruments for procedures or learning simulation may form the basis for input to the system. Instruments can include an imaging tool 656, such as an ultrasound, a tracked instrument 657, which can have tactile augmentation such as tactile or haptic feedback, a magic wand with a tangible user interface 658, or other tool 659.

Various components, including the learning modules, imaging tool, tracked tool with a physical implementation, magic wand, or other tool may be connected to an Electronics Unit 660, (such as a TrakStar, DriveBay or other) which can be a component of a tracking system 104 (described in FIG. 1A). The Electronics Unit 660 interfaces to a transmitter and amplifies and encodes signals from the sensors into selectable data formats. Learning modules or instruments can be connected to the Electronics Unit 660 via a transmitter (e.g., 655) that sends position and orientation information from the sensors to the Electronics Unit 660. A tracker box 663 contains the Electronics Unit 660, a microcontroller board, USB hubs, power supplies and strain relief for the fragile thin wires for the sensors. The sensor wire and connections are protected inside the tracker box 663 and not readily accessible to users. Advantageously, the tracker box 663 design enables "turn key" set-up, operation, and dismantling of the system so that it can be set up by a person unfamiliar with the simulator, usually in about 7 minutes or less. The tracker box 663 is designed to protect the user from having to handle the fragile tracking hardware connectors.

The imaging plane display 661 may show aspects of position and orientation indicators as disclosed herein. Other displays may include 3D visualization or visual augmentation 662 constructing or displaying aspects of the physical and virtual model of a mixed reality system.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above or to medical procedures only. Rather, the specific features and acts described above are disclosed as examples of implementing the claims and other equivalent features and acts are intended to be within the scope of the claims.

What is claimed is:

1. An instrument connector device comprising:
   an instrument connecting component for removably connecting a first medical instrument to the instrument connector device; and
   a second instrument connecting component for connecting at least a second medical instrument to the instrument connector device, wherein the second instrument comprises an imaging device, wherein the instrument connector device is configured to provide at least one of haptic feedback, tactile feedback, auditory feedback, or visual feedback via a feedback unit, in response to an interaction in a mixed reality system comprising at least one of a (a) virtual model or (b) a physical model, wherein the at least one of the haptic feedback, the tactile feedback, the auditory feedback, or the visual feedback reflects the interaction of the first medical instrument relative to an imaging plane of the imaging device.

2. The instrument connector device according to claim 1, wherein the first medical instrument is a needle, and the needle is connectable to the instrument connecting component by at least needle tubing.

3. The instrument connector device according to claim 1, wherein the instrument connector device is communicatively connectable to at least one sensor configured to track at least one of a position or an orientation of the first medical instrument, wherein the haptic, tactile, auditory, or visual feedback is dependent upon at least one of the tracked position or the orientation of the first medical instrument.

4. The instrument connector device according to claim 1, wherein when a syringe comprising a syringe plunger is connected to the instrument connector device via the second instrument connecting component, a resistance to movement of the syringe plunger varies responsive to at least one of a pushing of or pulling on the syringe plunger.

5. The instrument connector device according to claim 4, wherein the feedback unit comprises at least one valve or actuator configured to regulate varying pressures in a space between a syringe tip and a plunger face of the syringe.

6. The instrument connector device according to claim 1, wherein the first medical instrument is a needle connected to the instrument connector device via the instrument connecting component, wherein the second medical instrument is a syringe comprising a syringe plunger and is connected to the instrument connector device via the second instrument connecting component, and wherein resistance to movement of the syringe plunger varies dependent upon at least one of a position or an orientation of a tip of the needle relative to a virtual object of the virtual model, or a physical object of the physical model.

7. The instrument connector device according to claim 6, wherein at least one of the physical object or the virtual object is or is associated with a vessel, cavity, organ, location, or potential space.

8. The instrument connector device according to claim 1, connectable to or further comprising a vibration motor configured to simulate different tactile qualities depending on a type of tissue associated with a portion of the virtual model or the physical model with which the first medical instrument interacts.

9. The instrument connector device according to claim 1, further comprising at least one magnetic tracking sensor, wherein at least one of the first medical instrument or the second medical instrument comprises non-magnetic materials.

10. The instrument connector device according to claim 1, wherein the first medical instrument comprises at least one of a needle for medical procedures, a syringe, an introducer, a dilator, a catheter, tubes, a guidewire, a biopsy device, a needle ablation device, an electrocautery needle, a brachytherapy instrument, a cryotherapy instrument, a thermotherapy instrument, a drainage device, or a fine needle aspiration device.

11. A feedback system comprising:
a tracking system configured to track at least one of a position or an orientation of at least one medical instrument with respect to at least two interchangeable physical models, wherein the tracking system is at least one of: (a) attachable to at least one stand configured to interchangeably receive any of the at least two interchangeable physical models, or (b) movable to be positioned approximate to any of the at least two interchangeable physical models; and
one or more processors configured to cause display of at least one of a virtual representation, or a three dimensional (3D) visualization, to further reflect a visual representation of any of the at least two interchangeable physical models attached to or approximate the tracking system, and at least one of a position or an orientation of the at least one medical instrument relative to any of the at least two interchangeable physical models attached to or approximate the tracking system, wherein the one or more processors are further configured to:
supplement at least one of the virtual representation or the 3D visualization with visual feedback reflecting an angle of an imaging plane relative to at least one of (a) a physical model, a virtual model, or a portion thereof, or (b) another instrument.

12. The feedback system according to claim 11, wherein the tracking system comprises a tracker box device encapsulating an interface to a transmitter device, wherein the tracker box device protects hardware connectors within the tracker box device, wherein the at least one medical instrument is connectable to the tracker box device.

13. The feedback system according to claim 11, wherein the virtual representation is a simulated ultrasound image.

14. An apparatus comprising on or more processors and at least one memory including computer program code, the at least one memory and the computer program code configured to, with the one or more processors, cause the apparatus to at least:
receive an indication of at least one of a position or an orientation of a tracked instrument relative to a physical model or a virtual model, the tracked instrument having an associated imaging plane;
cause display of at least one of a virtual representation or a 3D visualization of the physical model or the virtual model, wherein in an instance an angle of the imaging plane relative to at least one of (a) the physical model or the virtual model or portion thereof, or (b) another instrument, has a first predefined relationship with a predetermined threshold angle, cause the displayed virtual representation or the displayed 3D visualization to have a first display property, and in an instance the angle of the imaging plane relative to at least one of (a) the physical model, the virtual model, or a portion thereof, or (b) another instrument, has a second predefined relationship with the predetermined threshold angle, cause the displayed virtual representation or the displayed 3D visualization to have a second display property.

15. The apparatus according to claim 14, wherein the first predefined relationship comprises the angle being equal to or less than the predetermined threshold angle, and the second predefined relationship comprises the angle being greater than the predetermined threshold angle.

16. The apparatus according to claim 14, wherein the first predefined relationship comprises the angle being less than the predetermined threshold angle, and the second predefined relationship comprises the angle being equal to or greater than the predetermined threshold angle.

17. The apparatus according to claim 14, wherein causing the displayed virtual representation or the displayed 3D visualization to have the second display property comprises causing at least one of an imaged instrument, an imaged organ, an imaged tissue, or at least a portion of the displayed virtual representation or the displayed 3D visualization to change in brightness or disappear to simulate a change in echogenicity.

18. The apparatus according to claim 14, wherein in an instance the angle has the second predefined relationship with the predetermined threshold angle, the at least one memory and the computer program code are configured to, with the one or more processors, cause the apparatus to cause a notification to be provided.

19. The apparatus according to claim 14, wherein the at least one memory and the computer program code configured to, with the one or more processors, cause the apparatus to cause display of a clock-face indicator indicating a rotation of the tracked instrument relative to an anatomical plane.

20. The apparatus according to claim 14, wherein the at least one memory and the computer program code configured to, with the one or more processors, cause the apparatus to at least:
- receive an indication of an input indicative of hydrolocation or hydro-dissection; and
- modify at least one of the virtual representation or the 3D visualization to show an effect of a pool of liquid delivered via a needle based upon a location of a tracked needle tip.

* * * * *